(12) United States Patent
Skurdalsvold et al.

(10) Patent No.: US 9,945,362 B2
(45) Date of Patent: Apr. 17, 2018

(54) PUMP FLUID END WITH INTEGRATED WEB PORTION

(71) Applicant: S.P.M. Flow Control, Inc., Fort Worth, TX (US)

(72) Inventors: Scott Skurdalsvold, Qindao-shi (CN); Jacob A. Bayyouk, Richardson, TX (US); Johnny E. DeLeon, Arlington, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 1247 days.

(21) Appl. No.: 13/755,884

(22) Filed: Jan. 31, 2013

(65) Prior Publication Data

US 2013/0195701 A1   Aug. 1, 2013
US 2017/0114780 A9   Apr. 27, 2017
US 2018/0058430 A9   Mar. 1, 2018

Related U.S. Application Data

(63) Continuation-in-part of application No. 29/419,425, filed on Apr. 27, 2012, now Pat. No. Des. 679,293, (Continued)

(51) Int. Cl.
*F04B 39/12* (2006.01)
*F04B 53/16* (2006.01)
(Continued)

(52) U.S. Cl.
CPC ............. *F04B 1/00* (2013.01); *B23P 15/00* (2013.01); *F04B 39/122* (2013.01); *F04B 53/007* (2013.01); *F04B 53/16* (2013.01)

(58) Field of Classification Search
CPC ....... F04B 53/007; F04B 53/16; F04B 39/122
(Continued)

(56) References Cited

U.S. PATENT DOCUMENTS 2,006,879 A   7/1935   Benedek
2,559,659 A   7/1951   Redman
(Continued)

FOREIGN PATENT DOCUMENTS

AR   084230 A1   5/2013
AR   084231 A1   5/2013
(Continued)

OTHER PUBLICATIONS

Co-pending U.S. Appl. No. 29/461,771, filed Jul. 26, 2013.
(Continued)

*Primary Examiner* — Peter J Bertheaud
(74) *Attorney, Agent, or Firm* — Haynes and Boone, LLP

(57) ABSTRACT

A fluid end block for attachment to a power end of a high pressure reciprocating pump includes a main body portion having an outwardly facing body forward face, an outwardly facing body rear face opposite the body forward face, and opposing side surfaces. A web portion protrudes outwardly from the outwardly facing body forward face. The web portion may have an outwardly facing web forward face and a curvilinear side surface. The web portion may be integral with the main body portion. A plurality of bosses protrude from the web forward face and having a forward facing end. The plurality of bosses may be integral with the main body portion and the web portion. A plunger bore extends through one of the plurality of bosses configured to receive a reciprocating plunger.

44 Claims, 11 Drawing Sheets

Related U.S. Application Data which is a continuation-in-part of application No. 29/411,974, filed on Jan. 27, 2012, now Pat. No. Des. 679,290.

(60) Provisional application No. 61/593,710, filed on Feb. 1, 2012.

(51) Int. Cl.
  *F04B 53/00* (2006.01)
  *F04B 1/00* (2006.01)
  *B23P 15/00* (2006.01)

(58) Field of Classification Search
  USPC .................................................. 417/454, 539
  See application file for complete search history.

(56) References Cited

U.S. PATENT DOCUMENTS

| | | |
|---|---|---|
| 2,666,026 A | 1/1954 | Gibbs |
| 2,732,810 A | 1/1956 | Simpson |
| 2,776,701 A | 1/1957 | Denis |
| 3,081,252 A | 3/1963 | Preiser et al. |
| 3,159,559 A | 12/1964 | Eberhardt, III |
| 3,427,988 A | 2/1969 | Redman et al. |
| 3,470,077 A | 9/1969 | Higgins |
| 3,679,332 A | 7/1972 | Yohpe |
| 3,810,716 A | 5/1974 | Abrahams et al. |
| 3,844,921 A | 10/1974 | Benedict |
| 3,919,068 A | 11/1975 | Gary |
| 3,963,384 A | 6/1976 | Bastenhof |
| 4,097,357 A | 6/1978 | Jacquelin |
| 4,339,227 A | 7/1982 | Furst |
| 4,370,211 A | 1/1983 | Hybler |
| 4,378,853 A | 4/1983 | Chia et al. |
| 4,412,792 A | 11/1983 | LaBorde et al. |
| 4,520,837 A | 6/1985 | Cole et al. |
| 4,861,241 A | 8/1989 | Gamboa et al. |
| 4,878,815 A | 11/1989 | Stachowiak |
| 5,059,101 A | 10/1991 | Valavaara |
| 5,102,297 A | 4/1992 | Thompson |
| 5,127,807 A | 7/1992 | Eslinger |
| 5,154,589 A | 10/1992 | Ruhl et al. |
| 5,171,136 A | 12/1992 | Pacht |
| 5,246,355 A | 9/1993 | Matzner et al. |
| D354,495 S | 1/1995 | Tojo |
| D355,199 S | 2/1995 | Ousey |
| D361,575 S | 8/1995 | Makino |
| 5,584,672 A | 12/1996 | Simonette |
| 5,636,975 A | 6/1997 | Tiffany et al. |
| 5,639,227 A | 6/1997 | Mills |
| 5,823,541 A | 10/1998 | Dietle et al. |
| 5,839,468 A | 11/1998 | Allred |
| 5,848,878 A | 12/1998 | Conti et al. |
| 5,947,697 A | 9/1999 | Morrison |
| D420,683 S | 2/2000 | Suzuki |
| 6,065,453 A | 5/2000 | Zych |
| 6,382,940 B1 | 5/2002 | Blume |
| 6,386,751 B1 | 5/2002 | Wootan et al. |
| 6,419,459 B1 | 7/2002 | Sibbing |
| D461,733 S | 8/2002 | Iida |
| D461,827 S | 8/2002 | Koebbe |
| 6,544,012 B1 | 4/2003 | Blume |
| 6,588,405 B1 | 7/2003 | Streicher et al. |
| 6,595,278 B1 | 7/2003 | Lam et al. |
| 6,623,259 B1 | 9/2003 | Blume |
| 6,670,312 B2 | 12/2003 | Sugimoto et al. |
| 6,705,396 B1 | 3/2004 | Ivannikov et al. |
| 6,843,313 B2 | 1/2005 | Hult |
| D506,210 S | 6/2005 | Selic et al. |
| 6,910,871 B1 | 6/2005 | Blume |
| 7,036,688 B2 | 5/2006 | Stettes et al. |
| 7,118,114 B2 | 10/2006 | Burdick et al. |
| 7,186,097 B1 | 3/2007 | Blume |
| 7,255,163 B2 | 8/2007 | Rivard |
| D552,139 S | 10/2007 | Cho |
| D556,861 S | 12/2007 | Yokohari |
| D556,862 S | 12/2007 | Yokohari |
| D557,286 S | 12/2007 | Pedrollo |
| 7,335,002 B2 | 2/2008 | Vicars |
| 7,341,435 B2 * | 3/2008 | Vicars .................. F04B 53/007 137/512 |
| 7,364,412 B2 | 4/2008 | Kugelev et al. |
| 7,404,704 B2 | 7/2008 | Kugelev et al. |
| D583,389 S | 12/2008 | Bilger |
| D584,320 S | 1/2009 | Huang |
| 7,484,452 B2 | 2/2009 | Baxter et al. |
| 7,513,759 B1 | 4/2009 | Blume |
| D603,870 S | 11/2009 | Mehnert et al. |
| D605,665 S | 12/2009 | Falkenberg |
| D606,629 S | 12/2009 | Tokumoto |
| D623,200 S | 9/2010 | Fulkerson et al. |
| D629,423 S | 12/2010 | Varini |
| 7,874,369 B2 | 1/2011 | Parker et al. |
| D641,382 S | 7/2011 | Hawes et al. |
| 8,016,027 B2 | 9/2011 | Boyles |
| 8,074,999 B2 | 12/2011 | Burdick et al. |
| 8,105,055 B2 | 1/2012 | Small |
| D655,314 S | 3/2012 | Yoshimura et al. |
| D657,799 S | 4/2012 | Jung |
| 8,147,227 B1 | 4/2012 | Blume |
| D660,191 S | 5/2012 | Asaba |
| D667,532 S | 9/2012 | Asaba |
| D670,312 S | 11/2012 | Alexander et al. |
| D670,790 S | 11/2012 | Tokumoto |
| D676,111 S | 2/2013 | Fukano et al. |
| D679,290 S * | 4/2013 | Skurdalsvold .................. D15/7 |
| D679,292 S * | 4/2013 | DeLeon ......................... D15/7 |
| D679,293 S | 4/2013 | DeLeon et al. |
| 8,465,268 B2 | 6/2013 | Baxter et al. |
| D687,929 S | 8/2013 | Asaba |
| D691,180 S | 10/2013 | DeLeon et al. |
| 8,550,102 B2 * | 10/2013 | Small .................. F04B 53/1032 137/15.18 |
| 8,601,687 B2 * | 12/2013 | Ochoa .................... F04B 53/12 248/639 |
| 8,662,864 B2 | 3/2014 | Bayyouk et al. |
| 8,662,865 B2 | 3/2014 | Bayyouk et al. |
| 8,668,470 B2 | 3/2014 | Bayyouk et al. |
| D705,817 S | 5/2014 | Bayyouk |
| D706,397 S | 6/2014 | Hawes et al. |
| D706,832 S * | 6/2014 | Bayyouk ......................... D15/7 |
| D706,833 S | 6/2014 | DeLeon et al. |
| D720,047 S | 12/2014 | Morodomi et al. |
| 2003/0235508 A1 | 12/2003 | Vicars |
| 2004/0219042 A1 | 11/2004 | Kugelev et al. |
| 2006/0002806 A1 | 1/2006 | Bazter et al. |
| 2006/0159573 A1 | 7/2006 | Inoue et al. |
| 2007/0051508 A1 | 3/2007 | Pecorari et al. |
| 2007/0237651 A1 | 10/2007 | Tojo |
| 2008/0003122 A1 | 1/2008 | Tian et al. |
| 2008/0138224 A1 | 6/2008 | Vicars |
| 2009/0123303 A1 | 5/2009 | Ohnishi |
| 2009/0314645 A1 | 12/2009 | Kim |
| 2010/0322802 A1 | 12/2010 | Kugelev |
| 2011/0189040 A1 | 8/2011 | Vicars |
| 2011/0198072 A1 | 8/2011 | Cote et al. |
| 2011/0308967 A1 | 12/2011 | Byrne |
| 2012/0063936 A1 | 3/2012 | Baxter et al. |
| 2012/0144995 A1 | 6/2012 | Bayyouk et al. |
| 2012/0183424 A1 | 7/2012 | Bayyouk et al. |
| 2012/0288387 A1 | 11/2012 | Freed et al. |
| 2013/0216413 A1 | 8/2013 | Bayyouk et al. |
| 2014/0322033 A1 | 10/2014 | Bayyouk et al. |
| 2014/0322034 A1 | 10/2014 | Bayyouk et al. |

FOREIGN PATENT DOCUMENTS

| | | |
|---|---|---|
| AU | 341981 | 4/2012 |
| AU | 343913 | 8/2012 |
| AU | 343914 | 8/2012 |
| AU | 346409 | 1/2013 |
| BR | 3020120007402 | 3/2013 |
| CA | 2486223 | 9/2010 |

(56) References Cited

FOREIGN PATENT DOCUMENTS

| | | |
|---|---|---|
| CA | 2350047 | 10/2010 |
| CA | 138269 | 7/2011 |
| CA | 2514769 | 9/2011 |
| CA | 2716430 | 5/2012 |
| CA | 144435 | 9/2012 |
| CA | 2711206 | 9/2012 |
| CA | 146660 | 10/2013 |
| CA | 148192 | 10/2013 |
| CA | 151028 | 10/2013 |
| CA | 149166 | 7/2014 |
| CA | 2833635 C | 2/2016 |
| CN | 2677588 Y | 2/2005 |
| CN | 200961570 Y | 10/2007 |
| CN | 201096243 Y | 8/2008 |
| CN | 201148968 | 11/2008 |
| CN | 101397672 | 4/2009 |
| CN | 101479473 A | 7/2009 |
| CN | 101571114 A | 11/2009 |
| CN | ZL201030691447 | 2/2012 |
| CN | ZL201230031196.2 | 12/2012 |
| CN | ZL201230337093.9 | 3/2013 |
| CN | ZL201230324855.1 | 5/2013 |
| CN | ZL201230513325.1 | 5/2013 |
| CN | ZL201230643096.5 | 7/2013 |
| CN | 103339379 A | 10/2013 |
| CN | 103348139 A | 10/2013 |
| DE | 10214404 | 10/2003 |
| EP | 0580196 | 1/1994 |
| EP | 1780415 | 5/2007 |
| EP | 001944054-0001 | 2/2012 |
| EP | 001335699-0001 | 9/2012 |
| EP | 001335699-0002 | 9/2012 |
| EP | 002125732-0001 | 1/2013 |
| GB | 1449280 | 9/1976 |
| GB | 2419642 | 5/2006 |
| GB | 2416811 | 9/2009 |
| IN | 243221 | 2/2012 |
| IN | 246712 | 7/2012 |
| IN | 248994 | 11/2014 |
| JP | 2000-170643 | 6/2000 |
| MX | 38797 | 5/2013 |
| MX | 39667 | 9/2013 |
| MX | 41048 | 2/2014 |
| RU | 2168064 | 5/2001 |
| RU | 87318 | 12/2013 |
| SA | 2446 | 9/2012 |
| SA | 3079 | 3/2015 |
| SG | D2012/168 I | 2/2012 |
| SG | D2012/874/J | 9/2012 |
| SG | D2012/875 G | 9/2012 |
| SG | D2012/1221/J | 10/2012 |
| SG | 191011 A1 | 7/2013 |
| SG | 191012 A1 | 7/2013 |
| UA | 109682 C2 | 9/2015 |
| UA | 109683 C2 | 9/2015 |
| WO | WO2004/092538 | 10/2004 |
| WO | WO 2005/015024 | 2/2005 |
| WO | WO 2005/088125 | 9/2005 |
| WO | WO 2011/018732 | 2/2011 |
| WO | WO 2011/027273 | 3/2011 |
| WO | WO 2011/054948 | 5/2011 |
| WO | WO 2011/160069 | 12/2011 |
| WO | WO 2012/078870 | 6/2012 |
| WO | WO 2012/078888 | 6/2012 |
| WO | WO 2012/145591 | 10/2012 |
| WO | WO-2013116535 | 8/2013 |

OTHER PUBLICATIONS

"Notice of Allowance dated Jul. 26, 2013, by the USPTO, regarding U.S. Appl. No. 29/445,736".
"Notice of Allowance dated May 29, 2013, by the USPTO, regarding U.S. Appl. No. 29/425,284".
"Office Action dated Aug. 14, 2013, by the USPTO regarding U.S. Appl. No. 13/314,745".
"Office Action dated Aug. 14, 2013, by the USPTO, regarding U.S. Appl. No. 13/849,228".
"Office Action dated Jul. 17, 2013, by the USPTO, regarding U.S. Appl. No. 29/420,822".
"Office Action dated Jul. 22, 2013, by the USPTO, regarding U.S. Appl. No. 13/314,831".
U.S. Appl. No. 29/399,897, filed Sep. 18, 2011, S.P.M. Flow Control, Inc.
U.S. Appl. No. 29/411,974, filed Jan. 27, 2012, S.P.M. Flow Control, Inc.
U.S. Appl. No. 29/419,417, filed Apr. 27, 2012, S.P.M. Flow Control, Inc.
U.S. Appl. No. 29/419,425, filed Apr. 27, 2012, S.P.M. Flow Control, Inc.
U.S. Appl. No. 29/420,822, filed May 14, 2012, S.P.M. Flow Control, Inc.
U.S. Appl. No. 29/424,801, filed Jun. 15, 2012, S.P.M. Flow Control, Inc.
U.S. Appl. No. 29/425,284, filed Jun. 21, 2012, S.P.M. Flow Control, Inc.
B.N. Cole; Strategy for Cross-Bores in High Pressure Containers; Journal Mechanical Engineering Science; vol. 11 No. 2 1969; pp. 151-161.
L.M. Masu; Cross Bore Configuration and Size Effects on the Stress Distribution in Thick-Walled Cylinders; Int. J. Pres. Ves. & Piping 72 (1997) pp. 171-176.
L.M. Masu; Numerical analysis of cylinders containing circular offset cross-bores—Abstract; International Journal of Pressure Vessels and Piping, vol. 75, Issue 3, Mar. 1998.
Xie He et al.; Fatigue Prediction for Pump End of High Pressure Fracturing Pump; Advanced Materials Research vol. 337 (2011) pp. 81-86.
Notice of Allowance dated Dec. 12, 2007, by the USPTO, regarding U.S. Appl. No. 10/913,221, now U.S. Pat. No. 7,364,412.
Examiner Interview Summary dated Oct. 9, 2007, by the USPTO, regarding U.S. Appl. No. 10/913,221, now U.S. Pat. No. 7,364,412.
Final Office Action dated Jul. 20, 2007, by the USPTO, regarding U.S. Appl. No. 10/913,221, now U.S. Pat. No. 7,364,412.
Office Action dated Mar. 29, 2007, by the USPTO, regarding U.S. Appl. No. 10/913,221, now U.S. Pat. No. 7,364,412.
Notice of Allowance dated Mar. 27, 2008, by the USPTO, regarding U.S. Appl. No. 10/835,749, now U.S. Pat. No. 7,404,704.
Office Action dated Jan. 10, 2008, by the USPTO, regarding U.S. Appl. No. 10/835,749, now U.S. Pat. No. 7,404,704.
Office Action dated Jun. 21, 2007, by the USPTO, regarding U.S. Appl. No. 10/835,749, now U.S. Pat. No. 7,404,704.
Office Action dated Apr. 25, 2013, by the USPTO, regarding U.S. Appl. No. 13/162,815.
Office Action dated Nov. 9, 2010, re Design U.S. Appl. No. 29/363,376, now U.S. Pat. No. D. 641,382.
Notice of Allowance dated Mar. 8, 2011, re Design U.S. Appl. No. 29/363,376, now U.S. Pat. No. D. 641,382.
Notice of Allowance dated Apr. 18, 2013, by the USPTO, regarding Design U.S. Appl. No. 29/399,897.
Office Action dated Jul. 23, 2012, by the USPTO, regarding Design U.S. Appl. No. 29/411,974.
Office Action dated Nov. 6, 2012, by the USPTO, regarding Design U.S. Appl. No. 29/411,974.
Notice of Allowance dated Jan. 10, 2013, by the USPTO, regarding Design U.S. Appl. No. 29/411,974.
Notice of Allowance dated Jan. 18, 2013, by the USPTO, regarding Design U.S. Appl. No. 29/419,417.
Notice of Allowance dated Jan. 23, 2013, by the USPTO, regarding Design U.S. Appl. No. 29/419,425.
Notice of Allowance dated Apr. 12, 2013, by the USPTO, regarding Design U.S. Appl. No. 29/420,822.
Search Report, dated Oct. 31, 2005, from the UK Patent Office regarding App No. GB0516137.7.
Search Report, dated Jan. 18, 2005, from the UK Patent Office regarding App No. GB0424019.8.

(56) References Cited

OTHER PUBLICATIONS

Examination Report issued by Intellectual Property India, dated Aug. 31, 2012, regarding Indian Design Application No. 246713.
Examination Report issued by Intellectual Property India, dated Mar. 28, 2013, regarding Indian Design Application No. 246713.
Examination Report issued by Intellectual Property India, dated Sep. 14, 2012, regarding Indian Design Application No. 246712.
Examination Report issued by Intellectual Property India, dated Jan. 3, 2013, regarding Indian Design Application No. 248994.
Canadian Examiner's Report issued by the CIPO, dated Jan. 10, 2013, regarding App No. 146,660.
International Preliminary Report on Patentability, dated Dec. 19, 2012, by the International Bureau of WIPO, in connection with International Application No. PCT/US2011/040960.
International Search Report and Written Opinion, dated Nov. 1, 2011, by the ISA/US, in connection with International Application No. PCT/US2011/040960.
International Search Report and Written Opinion, dated Jul. 20, 2012, by the ISA/KR, in connection with International Application No. PCT/US2011/063946.
International Search Report and Written Opinion, dated Jul. 20, 2012, by the ISA/KR, in connection with International Application No. PCT/US2011/063968.
International Search Report and Written Opinion, dated Jun. 29, 2012, by the ISA/US, in connection with International Application No. PCT/US2012/034397.
International Search Report and Written Opinion of the ISA/US dated Apr. 8, 2013 in connection with PCT/US2013/024172.
"Canadian Exam Report dated Feb. 11, 2014, by the CIPO, re App No. 149166".
"Office Action dated Feb. 14, 2014, by the USPTO, re U.S. Appl. No. 13/451,842".
"Australia Examination Report, dated Jul. 22, 2013, by IP Australia, re Reg. No. 346409".
"Canadian Examination Report, dated Aug. 20, 2013, by the CIPO, re App No. 149166".
"Notice of Allowance dated Dec. 19, 2103, by the USPTO, re U.S. Appl. No. 13/849,228".
"Notice of Allowance dated Dec. 24, 2013, by the USPTO, re U.S. Appl. No. 13/314,831".
"Notice of Allowance dated Feb. 4, 2014, by the USPTO, re U.S. Appl. No. 29/420,822".
"Notice of Allowance dated Jan. 16, 2014, by the USPTO, re U.S. Appl. No. 29/467,436".
"Notice of Allowance dated Jan. 22, 2014, by the USPTO, re U.S. Appl. No. 29/461,771".
"Notice of Allowance dated Jan. 27, 2014, by the USPTO, re U.S. Appl. No. 29/424,801".
"Notice of Allowance dated Jan. 7, 2014, by the USPTO, re U.S. Appl. No. 29/425,284".
"Notice of Allowance dated Jan. 8, 2014, by the USPTO, re U.S. Appl. No. 13/314,745".
"Notice of Allowance dated Nov. 4, 2013, by the USPTO, re U.S. Appl. No. 29/467,436".
"Notice of Allowance dated Oct. 10, 2013, by the USPTO, re U.S. Appl. No. 29/461,771".
"Notice of Allowance dated Oct. 17, 2013, by the USPTO, re U.S. Appl. No. 29/420,822".
"Notice of Allowance dated Sep. 24, 2013, by the USPTO, re U.S. Appl. No. 29/425,284".
"Australia Exam Report dated Jan. 8, 2016, by IP Australia, re App No. 2011338323".
"Australia Exam Report dated Oct. 9, 2015, re App No. 2011338305".
"Canadian Exam Report dated Feb. 24, 2015, by the CIPO, re App No. 2833635".
"Canadian Notice of Allowance dated Oct. 16, 2015, re App No. 2833635".
"Chinese Office Action dated Feb. 3, 2016, by the SIPO of China, re App No. 201280030481.X".
"Chinese Office Action dated Apr. 3, 2015, issued by SIPO, re App No. 201180066898.7".
"Chinese Office Action dated Mar. 30, 2015, issued by SIPO, re App No. 201180066904.9".
"Chinese Office Action dated Nov. 17, 2015, by the SIPO of China, re App No. 201380016217.5".
"Eurasia Office Action dated Aug. 18, 2015, re App No. 201390845".
"Eurasia Office Action dated Aug. 18, 2015, re App No. 201390846".
"European Extended Search Report dated Nov. 25, 2015, re App No. 11847704.1".
"Final Office Action dated Jan. 21, 2016, by the USPTO, re U.S. Appl. No. 14/195,196".
"GCC Exam Report dated Aug. 23, 2015, re App No. 2011-19940".
"GCC Exam Report dated Jan. 22, 2015, re App No. 2011-19943".
"Notice of Allowance dated Feb. 19, 2015, by the USPTO, re U.S. Appl. No. 29/491,554".
"Office Action / Election Requirement dated Jun. 30, 2015, by the USPTO, re U.S. Appl. No. 13/755,884".
"Office Action / Restriction Requirement dated Nov. 25, 2015, by the USPTO, re U.S. Appl. No. 13/755,884".
"Office Action dated Aug. 12, 2015, by the USPTO, re U.S. Appl. No. 14/195,165".
"Office Action dated Jun. 16, 2015, by the USPTO, re U.S. Appl. No. 14/195,196".
"Office Action/Restriction dated Apr. 6, 2015, by the USPTO, re U.S. Appl. No. 14/195,196".
"Office Action/Restriction dated Jun. 5, 2015, by the USPTO, re U.S. Appl. No. 14/195,165".
First Office Action and its English translation issued by the State Intellectual Property Office of China dated Sep. 20, 2017 in connection with related Chinese Patent Application 201610528417.4 (8 pages).

\* cited by examiner

PUMP FLUID END WITH INTEGRATED WEB PORTION

CROSS-REFERENCE TO RELATED APPLICATION

This application claims the benefit of the filing date of U.S. patent application No. 61/593,710, filed Feb. 1, 2012, titled "Pump Fluid End with Integrated Packing Glands," the entire disclosure of which is incorporated herein by reference. This application is also a continuation-in-part (CIP) of U.S. patent application Ser. No. 29/419,425, filed Apr. 27, 2012, titled "Center Portion of a Fluid Cylinder for a Pump," now issued as U.S. Pat. No. D679,293. This application is also a continuation-in-part (CIP) of U.S. patent application Ser. No. 29/411,974, filed Jan. 27, 2012, titled "Fluid End Block for a Reciprocating Pump," now issued as U.S. Pat. No. D679,290.

TECHNICAL FIELD

This disclosure relates in general to oil field well service pumps, and, in particular, to a high pressure reciprocating pump having integrated web support.

BACKGROUND OF THE DISCLOSURE

Well service pumps are employed for pumping fluids into wells for treatment, such as hydraulic fracturing. The flow rates and the pressures are often high; pressures may exceed 10,000 psi. A typical well service pump has a power end that connects to a separate fluid end block with stay rods. The power end reciprocates plungers that stroke within plunger bores in the fluid end block. A packing gland member is used to seal the interface between the plunger and the fluid end block.

Packing gland members come in a range of standard sizes and are used for different plunger diameters with the same fluid end block. The packing gland member is bolted to the fluid end block. However, a bolt-on packing gland requires a seal that can create problems. Also, the bolt-on arrangement may create higher stresses in certain areas, leading to stress fractures. Often, the packing gland is held to the power end via tie rods. This too can lead to higher stresses in certain areas.

SUMMARY

In a first exemplary aspect, this disclosure is directed to a fluid end block for attachment to a power end of a high pressure reciprocating pump. The fluid end block may include a main body portion having a plurality of chambers therein, the main body portion having an outwardly facing body forward face, an outwardly facing body rear face opposite the body forward face, and opposing side surfaces connecting the forward face and the rear face; a web portion protruding outwardly from the outwardly facing body forward face, the web portion having an outwardly facing web forward face and a curvilinear side surface, the web portion being integral with the main body portion; a plurality of bosses protruding from the web forward face and having a forward facing end, the plurality of bosses being integral with the main body portion and the web portion; and a plunger bore extending through one of the plurality of bosses configured to receive a reciprocating plunger, the plunger bore extending from the end of said one of the plurality of bosses to one of the plurality of chambers in the main body portion.

In an exemplary embodiment, the curvilinear side surface comprises a convex portion concentric with each of the plurality of bosses.

In an exemplary embodiment, the convex portion has a radius greater than a radius of each of the plurality of bosses.

In an exemplary embodiment, the main body portion comprises a tie rod hole disposed adjacent the web portion, the tie rod hole being disposed between undulating portions of the web portion.

In an exemplary embodiment, the curvilinear side surface comprises a concave portion concentric with a diameter of the tie rod hole.

In an exemplary embodiment, the undulating portions are a portion of the curvilinear side surface.

In an exemplary embodiment, the undulating portions are fillets connecting the curvilinear side surface of the web portion to the body forward face.

In an exemplary embodiment, each of the plurality of bosses has a first length measured from the web forward face to the end of the boss, and wherein the web portion has a second length measured from the body forward face to the web forward face, the first length being greater than the second length.

In an exemplary embodiment, the web portion extends entirely across the body forward face from one of the opposing side surfaces to the other.

In an exemplary embodiment, the plurality of bosses is aligned in a row so that a single plane passes through a central axis formed by each of the plurality of bosses.

In an exemplary embodiment, the curvilinear side surface of the web portion is perpendicular to the body forward face and perpendicular to the web forward face.

In an exemplary embodiment, wherein each of the plurality of bosses comprises an outer surface portion having a first diameter adjacent the forward facing end and having a second diameter adjacent the web portion, the second diameter being greater than the first diameter.

In an exemplary embodiment, wherein the curvilinear side surface is an upper side surface, the fluid end block comprising a curvilinear lower side surface, wherein the curvilinear upper side surface mirrors the curvilinear lower side surface.

In an exemplary embodiment, the present disclosure is directed to pump assembly including the fluid end block and a power end including a reciprocating plunger extending into the plunger bore.

In an exemplary embodiment, the pump assembly includes tie rods extending from the power end, past the plurality of bosses, past the web portion, and into tie rod holes in the forward face of the main body portion.

In a second exemplary aspect, this disclosure is directed to a fluid end block for attachment to a power end of a high pressure reciprocating pump. The fluid end block may include a main body portion having a plurality of chambers therein, the main body portion having an outwardly facing body forward face, an outwardly facing rear face opposite the body forward face, and opposing side surfaces connecting the body forward face and the rear face; a plurality of bosses supported by the main body portion and having a forward facing end, the plurality of bosses being integral with the main body portion and having an outer diameter at the forward facing end; a web portion protruding outwardly from the outwardly facing body forward face of the main body portion, the web portion having a longitudinal length and a transverse height, the web portion joining each of the plurality of bosses to each other, the transverse height of the web portion being greater than the outer diameter of the plurality of bosses; and a plunger bore extending through one of the plurality of bosses configured to receive a reciprocating plunger, the plunger bore extending from the end of said one of the plurality of bosses to one of the plurality of chambers in the main body portion.

In an exemplary embodiment, the web portion comprises a curvilinear side surface comprising a convex portion concentric with each of the plurality of bosses.

In an exemplary embodiment, the convex portion of the web portion has a radius greater than a radius of each of the plurality of bosses.

In an exemplary embodiment, the main body portion comprises a tie rod hole disposed adjacent the web portion, the tie rod hole being disposed between undulating portions of the web portion.

In an exemplary embodiment, the undulating portions are formed of a curvilinear side portion comprising a concave portion concentric with a diameter of the tie rod hole.

In an exemplary embodiment, the undulating portions are a curvilinear side surfaces.

In an exemplary embodiment, the undulating portions are fillets connecting a curvilinear side surface of the web to the body forward face.

In an exemplary embodiment, each of the plurality of bosses has a first length measured from the web forward face to the end of the boss, and wherein the web portion has a second length measured from the body forward face to the web forward face, the first length being greater than the second length.

In an exemplary embodiment, the web portion extends entirely across the body forward face from one of the opposing side surfaces to the other.

In an exemplary embodiment, the plurality of bosses is aligned in a row so that a single plane passes through a central axis formed by each of the plurality of bosses.

In an exemplary embodiment, the web portion comprises upper and lower side surfaces and a web forward face, the upper and lower side surfaces being perpendicular to the body forward face and perpendicular to the web forward face.

In an exemplary embodiment, each of the plurality of bosses comprises an outer surface portion having a first diameter adjacent the forward facing end and a second diameter adjacent the web portion, the second diameter being greater than the first diameter.

In an exemplary embodiment, the web portion comprises curvilinear upper and lower side surfaces and a web forward face, wherein the curvilinear upper side surface mirrors the curvilinear lower side surface.

In an exemplary embodiment, a pump assembly includes the fluid end block and a power end including a reciprocating plunger extending into the plunger bore.

In an exemplary embodiment, the pump assembly includes tie rods extending from the power end, past the plurality of bosses, past the web portion, and into tie rod holes in the forward face of the main body portion.

In a third exemplary aspect, this disclosure is directed to a fluid end block for attachment to a power end of a high pressure reciprocating pump. The fluid end block may include a main body portion having an outwardly facing body forward face, an outwardly facing body rear face opposite the body forward face, and opposing side surfaces connecting the body forward face and the rear face, the main body portion comprising a plurality of tie rod holes configured to receive tie rods connecting the fluid end block to the power end of a high pressure reciprocating pump; a web portion protruding outwardly from the body forward face of the main body portion, the web portion having an curvilinear portion adjacent the tie rod holes, the curvilinear portion being shaped and disposed so that at least one of the tie rod holes is disposed between peaks of the curvilinear portion, the web portion being integrally formed with the main body portion; a plurality of bosses on the web portion, the plurality of bosses being integrally formed with the web portion and the main body portion; and a plunger bore extending through one of the plurality of bosses configured to receive a reciprocating plunger.

In an exemplary embodiment, the curvilinear portion comprises a convex portion concentric with each of the plurality of bosses.

In an exemplary embodiment, the convex portion has a radius greater than a radius of each of the plurality of bosses.

In an exemplary embodiment, the curvilinear portion comprises a concave portion concentric with a diameter of the tie rod hole.

In an exemplary embodiment, the curvilinear portion comprises a curvilinear side surface.

In an exemplary embodiment, wherein the curvilinear portion comprises a fillet connecting a side surface of the web portion to the body forward face.

In an exemplary embodiment, each of the plurality of bosses has an end and the web portion has a forward face, each of the plurality of bosses having a first length measured from the web forward face to the end of the boss, and the web portion having a second length measured from the body forward face to the web forward face, the first length being greater than the second length.

In an exemplary embodiment, the web portion extends entirely across the body forward face from one of the opposing side surfaces to the other.

In an exemplary embodiment, the plurality of bosses is aligned in a row so that a single plane passes through a central axis formed by each of the plurality of bosses.

In an exemplary embodiment, the curvilinear portion comprises a side surface of the web portion perpendicular to the body forward face.

In an exemplary embodiment, each of the plurality of bosses comprises an outer surface portion having a first diameter adjacent the forward facing end and a second diameter adjacent the web portion, the second diameter being greater than the first diameter.

In an exemplary embodiment, the curvilinear portion comprises a curvilinear upper side surface and a curvilinear lower side surface, wherein the curvilinear upper side surface mirrors the curvilinear lower side surface.

In an exemplary embodiment, the web portion is devoid of tie rod receiving holes.

In an exemplary embodiment, a fluid pump includes the fluid end block and tie rods extending to the main body so that the bosses are not held in tension.

In a fourth exemplary aspect, this disclosure is directed to a method of manufacturing a fluid end for a pump, including forming from a monolith material, a main body portion having an outwardly facing body forward face, an outwardly facing body rear face opposite the body forward face, and opposing side surfaces connecting the forward face and the rear face; forming from the monolith material, a web portion protruding outwardly from the outwardly facing body forward face, the web portion having an outwardly facing web forward face and a curvilinear side surface; forming from the monolith material, a plurality of bosses protruding from the web forward face and having a forward facing end; and forming a plunger bore extending through one of the plurality of bosses configured to receive a reciprocating plunger.

In an exemplary aspect, forming the web portion comprises shaping the curvilinear side surface to have a convex portion concentric with each of the plurality of bosses.

In an exemplary aspect, forming a tie rod hole in a location adjacent the web portion so that the tie rod hole is disposed between undulating portions of the web portion.

In a fifth exemplary aspect, this disclosure is directed to a fluid end block for attachment to a power end of a high pressure reciprocating pump. The fluid end block may include a main body portion having a plurality of chambers therein, the main body portion having an outwardly facing body forward face, an outwardly facing rear face opposite the body forward face, and opposing side surfaces connecting the body forward face and the rear face, the main body portion comprising a plurality of tie rod holes configured to receive tie rods connecting the fluid end block to a power end of a high pressure reciprocating pump; a web portion protruding outwardly from the outwardly facing body forward face, the web portion having an outwardly facing web forward face, an upper curvilinear side surface, and a lower curvilinear side surface mirroring the upper curvilinear side surface, the upper and lower curvilinear side surfaces having convex and concave portions, the web portion extending continuously from one of the opposing side surfaces of the main body portion to the other, and being integrally formed with the main body portion; a plurality of bosses protruding from the web forward face and having a forward facing end, each of the plurality of bosses having an end, a first region of a first diameter adjacent the end, and a second region of a second diameter adjacent the web portion, the second diameter being greater than the first diameter, the plurality of bosses being integral with the main body portion and the web portion, and wherein the convex portions of the upper and lower curvilinear side surfaces are concentric with the second region of each of the plurality of bosses, and wherein the concave portions of the upper and lower curvilinear side surfaces accommodate the tie rod holes so that the tie rod holes are disposed between portions of the web portion; and a plunger bore extending through one of the plurality of bosses configured to receive a reciprocating plunger, the plunger bore extending from the end of one of the plurality of bosses to one of the plurality of chambers in the main body portion.

In an exemplary embodiment, the tie rod holes are disposed between portions of a fillet connecting the curvilinear side surface of the web portion to the body forward face.

In an exemplary embodiment, the tie rod holes are disposed between portions of the curvilinear upper side surface of the web portion.

In an exemplary embodiment, the concave portions of the curvilinear upper and lower side surfaces are concentric with a diameter of the tie rod holes.

In an exemplary embodiment, each of the plurality of bosses has a first length measured from the web forward face to the end of the boss, and wherein the web portion has a second length measured from the body forward face to the web forward face, the first length being greater than the second length.

In an exemplary embodiment, the curvilinear side surface of the web portion is perpendicular to the body forward face and perpendicular to the web forward face.

In an exemplary embodiment, a pump assembly includes the fluid end block and a power end including a reciprocating plunger extending into the plunger bore.

In an exemplary embodiment, the pump assembly includes tie rods extending from the power end, past the plurality of bosses and past the web portion and into tie rod holes in the forward face of the main body portion.

In a sixth exemplary aspect, this disclosure is directed to a pump subassembly that includes a fluid end block having forward and rearward sides; a plurality of bosses protruding in a forward direction from the forward side, the fluid end block and the bosses being a single-piece steel alloy member; a plunger bore extending into the fluid end block from each of the bosses for receiving a reciprocating plunger, each of the plunger bores having a forward end with a set of internal threads; and a plurality of webs protruding from the forward side and joining adjacent ones of the bosses to each other.

In an exemplary embodiment, the webs are an integral part of the single-piece steel alloy member along with the bosses and the fluid end block; and wherein each of the webs having an upper side and a lower side and a dimension between the upper and lower sides that is no greater than an outer diameter of each of the bosses.

In an exemplary embodiment, wherein a horizontal line bisecting each of the webs also intersects an axis of each of the plunger bores.

In an exemplary embodiment, the pump subassembly includes a fillet joining a base of each of each of the bosses with the forward side of the fluid end block; wherein a wall thickness of each of the bases from the base to the counter bore over the radius of each of the fillets is in a range of from about 1.0 to about 2.25.

In an exemplary embodiment, the pump subassembly includes a web upper fillet joining the upper side of each of the webs with the forward side of the fluid end block; a web lower fillet joining the lower side of each of the webs with the forward side of the fluid end block; a boss upper fillet extending partially around each of the bosses and joining an upper circumferential portion of each of the bosses with the forward side of the fluid end block, each of the boss upper fillets having an end that joins an end of one of the web upper fillets, such that the web upper fillets and the boss upper fillets define a continuous upper fillet extending across the bosses; and a boss lower fillet extending partially around each of the bosses and joining a lower circumferential portion of each of the bosses with the forward side of the fluid end block, each of the boss lower fillets having an end that joins an end of one of the web lower fillets, such that the web lower fillets and the boss lower fillets define a continuous lower fillet extending across the bosses.

In an exemplary embodiment, each of the webs has a forward side that is a distance from the forward side of the fluid end block that is less than a distance from a forward end of each of the bosses to the forward side of the fluid end block.

In an exemplary embodiment, each of the bosses has a cylindrical forward end portion extending from a cylindrical base having a diameter greater than a diameter of the forward end portion; and a distance from a forward end of each of the bosses to the forward side of the fluid end block over a width of the base is in the range of from about 1.750 to about 1.944.

In an exemplary embodiment, the bosses comprise an outboard boss adjacent to each outboard side of the fluid end block and at least one intermediate boss located between the outboard bosses; and the fluid end block further comprises:

a pair of outboard webs, each outboard web extending from one of the outboard bosses to one of the outboard sides of the fluid end; and each of the outboard webs having an upper side and a lower side and a dimension between the upper and lower sides that is no greater than an outer diameter of each of the outboard bosses.

In an exemplary embodiment, the pump subassembly includes a plurality of stay rod threaded holes extending into the fluid end block from the forward side; and wherein the forward end of each of the bosses is located forward from an entrance of each of the stay rod threaded holes.

In a sixth exemplary aspect, this disclosure is directed to a pump subassembly that includes a fluid end block having forward and rearward sides, two outboard sides, a bottom, and a top; a plurality of bosses protruding in a forward direction from the forward side, the bosses comprising an outboard boss adjacent each of the outboard sides, and at least one intermediate boss located between the outboard bosses; a plunger bore extending into the fluid end block from each of the bosses for receiving a reciprocating plunger, each of the plunger bores having a forward end with internal threads; a web extending from the forward side of the fluid end block, the web having an outboard portion extending from each of the outboard sides to each of the outboard bosses, the web having an intermediate portion extending between adjacent ones of the bosses; the web having an upper side and a lower side, with a dimension between the upper and lower sides that is less than an outer diameter of any one of the bosses; and wherein the fluid end block, the bosses and the webs are integrally joined to each other and comprise a single-piece member formed of a steel alloy.

In an exemplary embodiment the web has a forward face that is located forward from the forward side of the fluid end block a distance that is less than a distance from the forward end of each of the bosses to the forward side of the fluid end block.

In an exemplary embodiment, the subassembly includes a continuous upper fillet extending without interruption from one of the outboard sides to the other of the outboard sides, the upper fillet joining the upper sides of the web to the forward side of the fluid end block and joining upper circumferential portions of the bosses to the forward side; and a continuous lower fillet extending without interruption from one of the outboard sides to the other of the outboard sides, the lower fillet joining the tower sides of the web to the forward side of the fluid end block and joining lower circumferential portions of the bosses to the forward side.

In an exemplary embodiment, each of the plunger bores has a counter bore for receiving a packing; each of the bosses has a wall thickness measured from a base of the boss to the counter bore; and a ratio of the wall thickness over a radius of each of the fillets is in a range of from about 1.0 to about 2.25.

In a seventh exemplary aspect, the present disclosure is directed to a well service pump including a power end having a crankshaft and a plurality of connecting rods; a fluid end block having forward and rearward sides, two outboard sides, a bottom, and a top; a plurality of bosses protruding in a forward direction from the forward side of the fluid end block, the bosses comprising an outboard boss adjacent each of the outboard sides, and at least one intermediate boss located between the outboard bosses; a web extending from the forward side of the fluid end block, the web having an outboard portion extending from each of the outboard sides to each of the outboard bosses, the web having an intermediate portion extending between adjacent ones of the bosses; a plunger bore extending into the fluid end block from each of the bosses, each of the plunger bores having a forward end with internal threads; a plurality of plungers, each of the plungers being operably coupled to one of the connecting rods for stroking movement within one of the plunger bores; a packing surrounding each of the plungers within each of the plunger bores; an externally threaded retainer nut that engages the internal threads of each of the plunger bores for energizing each of the packings; a plurality of stay rods extending from the power end to threaded holes foamed in the forward side of the fluid end block, the threaded holes having entrances spaced a distance rearward from forward ends of the bosses; and wherein the fluid end block and the bosses are integrally joined to each other and comprise a single-piece member formed of a steel alloy.

In an exemplary embodiment, the web has an upper side and a lower side with a dimension between the upper and lower sides that is less than an outer diameter of any one of the bosses; and wherein the web is integrally joined to the fluid end block and the bosses and forms a part of the single-piece member formed of a steel alloy.

In an exemplary embodiment, the pump includes a continuous upper fillet extending without interruption from one of the outboard sides to the other of the outboard sides, the upper fillet joining the upper sides of the web to the forward side of the fluid end block and joining upper circumferential portions of the bosses to the forward side of the fluid end block; and a continuous lower fillet extending without interruption from one of the outboard sides to the other of the outboard sides, the lower fillet joining the lower sides of the web to the forward side and joining lower circumferential portions of the bosses to the forward side of the fluid end block.

In a seventh exemplary aspect, the present disclosure is directed to a method of manufacturing a fluid end assembly of a reciprocating well service pump. The method may include (a) providing a single-piece forging of a steel alloy with a plurality of bosses protruding from a forward side of the single-piece forging, and providing a web in the single-piece forging extending between adjacent ones of the bosses and from outboard ones of the bosses to outboard sides of the single-piece forging, and (b) machining the single-piece forging into a configuration of a fluid-end block with a plunger bore having internal threads in each of the bosses.

In an exemplary aspect, each of the webs having an upper side and a lower side with a distance between the upper and lower sides being less than an outer diameter of each of the bosses.

In an exemplary aspect, step (a) further comprises: providing the single-piece forging with a continuous upper fillet extending without interruption from one of the outboard sides to the other of the outboard sides of the single-piece forging, the upper fillet joining the upper sides of the web to the forward side of the single-piece forging and joining upper circumferential portions of the bosses to the forward side of the single-piece forging; and providing the single-piece forging with a continuous lower fillet extending without interruption from one of the outboard sides to the other of the outboard sides, the lower fillet joining the lower sides of the web to the forward side of the single-piece forging and joining lower circumferential portions of the bosses to the forward side of the single-piece forging.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

DETAILED DESCRIPTION

Figure 1:
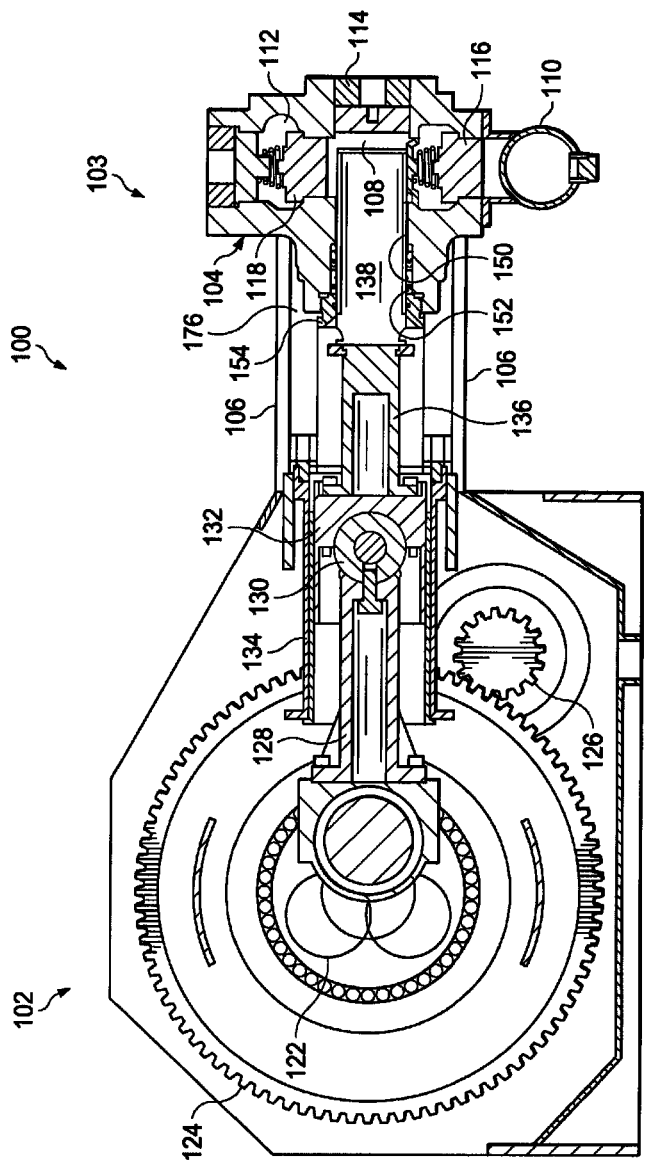
FIG. 1 is an elevational view of a reciprocating well service pump assembly according to an exemplary embodiment, the pump assembly including a fluid end block.

FIG. 1 shows a partial cross-sectional view of a high pressure reciprocating pump 100 according to an exemplary embodiment consistent with the principles disclosed herein. The high pressure reciprocating pump 100 may be a suitable pump for performing high pressure fracing operations, and may be used to obtain pressures of 15000 psi or more. The high pressure reciprocating pump 100 includes a power end 102 and a fluid end 103 having a fluid end block 104. Stay rods 106 connect the power end 102 to a forward facing side of the fluid end block 104. The fluid end block 104 has a plurality of chambers formed therein, including a plurality of cylinder chambers 108 (only one shown in FIG. 1). Each of the cylinder chambers 108 is in communication with a suction manifold 110 and a discharge port 112. A suction cover plate 114 connects to an end of each cylinder chamber 108 on a rearward side of the fluid-end 104 opposite the stay rods 106. A suction valve 116 opens the cylinder chamber 108 to the suction manifold 110 during the intake stroke. A discharge valve 118 opens the discharge port 112 of the cylinder chamber 108 during the discharge stroke.

The pump 100 can be free-standing on the ground, can be mounted to a trailer that can be towed between operational sites, or mounted to a skid such as for offshore operations. The power end 102 includes a crankshaft 122, which is rotated by a bull gear 124. A pinion gear 126 engages the bull gear 124. A power source such as an engine (not shown) connects to the pinion gear 126 to cause the bull gear 124 to rotate. A connecting rod 128 rotatably connects to the crankshaft 122. The connecting rod 128 has a wrist pin end 130 opposite from a bearing end, which connects to the crankshaft 122. The wrist pin end 130 pivotally connects to a crosshead 132. The crosshead 132 is constrained to linear movement due to being mounted within a stationary crosshead housing 134. The rotation of crankshaft 122 thus causes crosshead 132 to reciprocate. A pony rod 136 connects to the crosshead 132. The pony rod 136 has an opposite end connected to a plunger 138. In some instances, the plunger 138 will connect directly to the crosshead 132, eliminating the pony rod 136.

The plunger 138 extends through a plunger bore 150 in the fluid end block 104 that leads to the cylinder chamber 108. The suction and discharge valves 116 and 118 in the fluid end block 104 are usually actuated by a predetermined differential pressure. The suction valve 116 as an inlet valve actuates to control fluid flow through the suction manifold 110 into the cylinder chamber 108, and the discharge valve 118 as an outlet valve actuates to control fluid flow through the discharge port 112 from the cylinder chamber 108. The plunger 138 may be one of a plurality of plungers. Depending upon the embodiment, three or five plungers 138 may be utilized depending on the size of the pump 100. Other embodiments have a different number of plunger bores 150 and a corresponding number of plungers 138. A packing 152 is mounted within the plunger bore 150 to seal against the outer diameter of plunger 138. In the exemplary embodiment disclosed, the packing 152 is retained in position by a threaded retainer nut 154.

FIGS. 2-5 show an exemplary embodiment of the fluid end block 104 that forms a part of the fluid end 103 in FIG. 1. In this embodiment, the fluid end block 104 has three bores, and may be referred to as a triplex fluid end. In alternate embodiments, the fluid end block can have five bores and is called a "quint" or a quintuplex fluid end. Other fluid end blocks have other numbers of bores.

Figure 2:
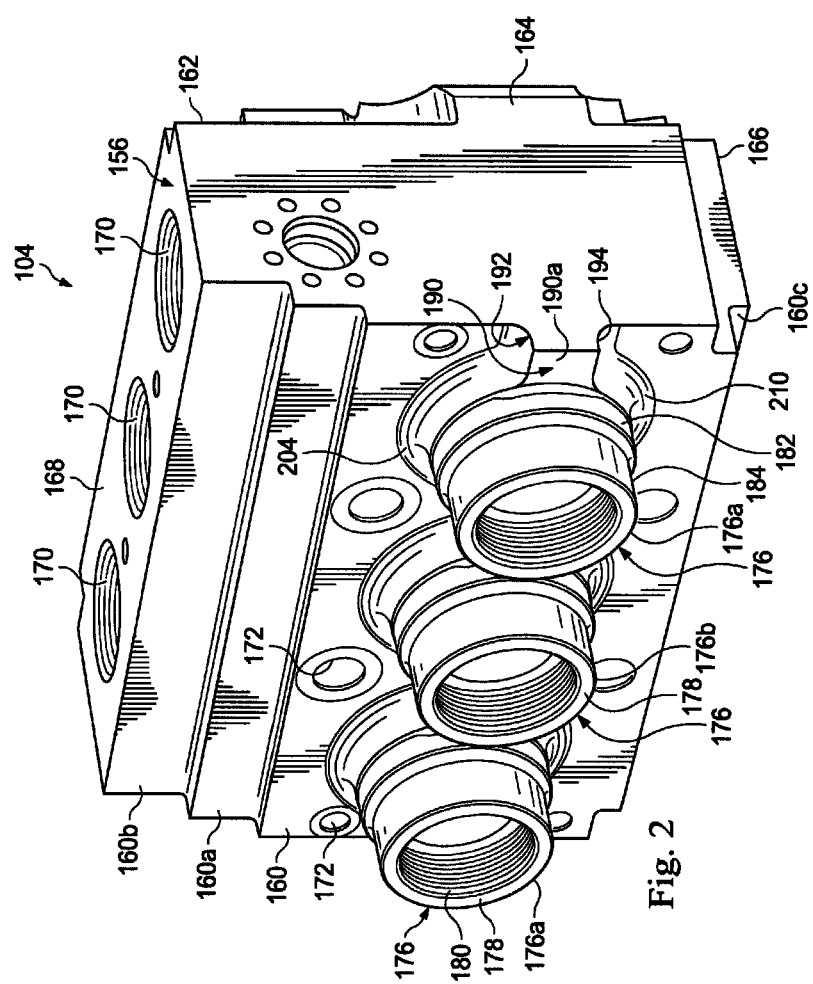
FIG. 2 is a perspective view of the fluid end block of the well service pump of FIG. 1 according to an exemplary embodiment.

Referring to FIG. 2 the fluid end block 104 is shown in more detail than the schematic representation in FIG. 1. The fluid end block 104 has a main body portion 156 having a forward face or forward side 160, a rearward side 162, outboard sides 164, a bottom 166, and a top 168. In the exemplary embodiment shown, the forward side 160 is generally flat and optionally may have at least two stepped recessed portions 160a and 160b on its upper section. The stepped upper portions 160a and 160b may also be flat. The first stepped upper portion 160a is located in a plane parallel and rearward of a plane containing the forward side 160. The second stepped upper portion 160b extends upward from the first stepped upper portion 160a and is located in a plane parallel and rearward of the plane containing the first stepped upper portion 160a. The forward side 160 may also have a stepped lower portion 160c, which is in a plane parallel with and recessed from forward side 160. The fluid end block 104 also has the rearward side 162 facing in a direction opposite the forward side 160. The fluid end block 104 has the two outboard sides 164 that are orthogonal to the forward side 160 and face in opposite directions. The bottom 166 and the top 168 join the forward and rearward sides 160, 162. Access ports 170 are provided for installing and removing valves 116, 118 (FIG. 1) and extend through the top 168. The discharge port 112 is located on one of the outboard sides 164. Threaded stay rod holes 172 for securing stay rods 106 (FIG. 1) are located on the forward side 160.

Bosses 176 are integrally formed with fluid end block 104 and protrude from the forward side 160. The bosses 176 include an outboard boss 176a near each outboard side 164 and at least one intermediate boss 176*b* located between the two outboard bosses 176*a*. In this example, there is only one intermediate boss 176*b*. In other embodiments, there are more than one intermediate bosses such as, but not limited to two, three, four, or more intermediate bosses. Each boss 176 is a generally cylindrical member having a forward end 178 that is forward of the fluid end forward side 160. Each boss 176 has one of the plunger bores 150 extending into the fluid end block 104 from the forward end 178. A set of threads 180, preferably internal, is formed in each plunger bore 150 at the forward end 178. Optionally, each boss 176 may have a cylindrical base portion 182 that has a larger outer diameter than a cylindrical forward portion 184.

Figure 3:
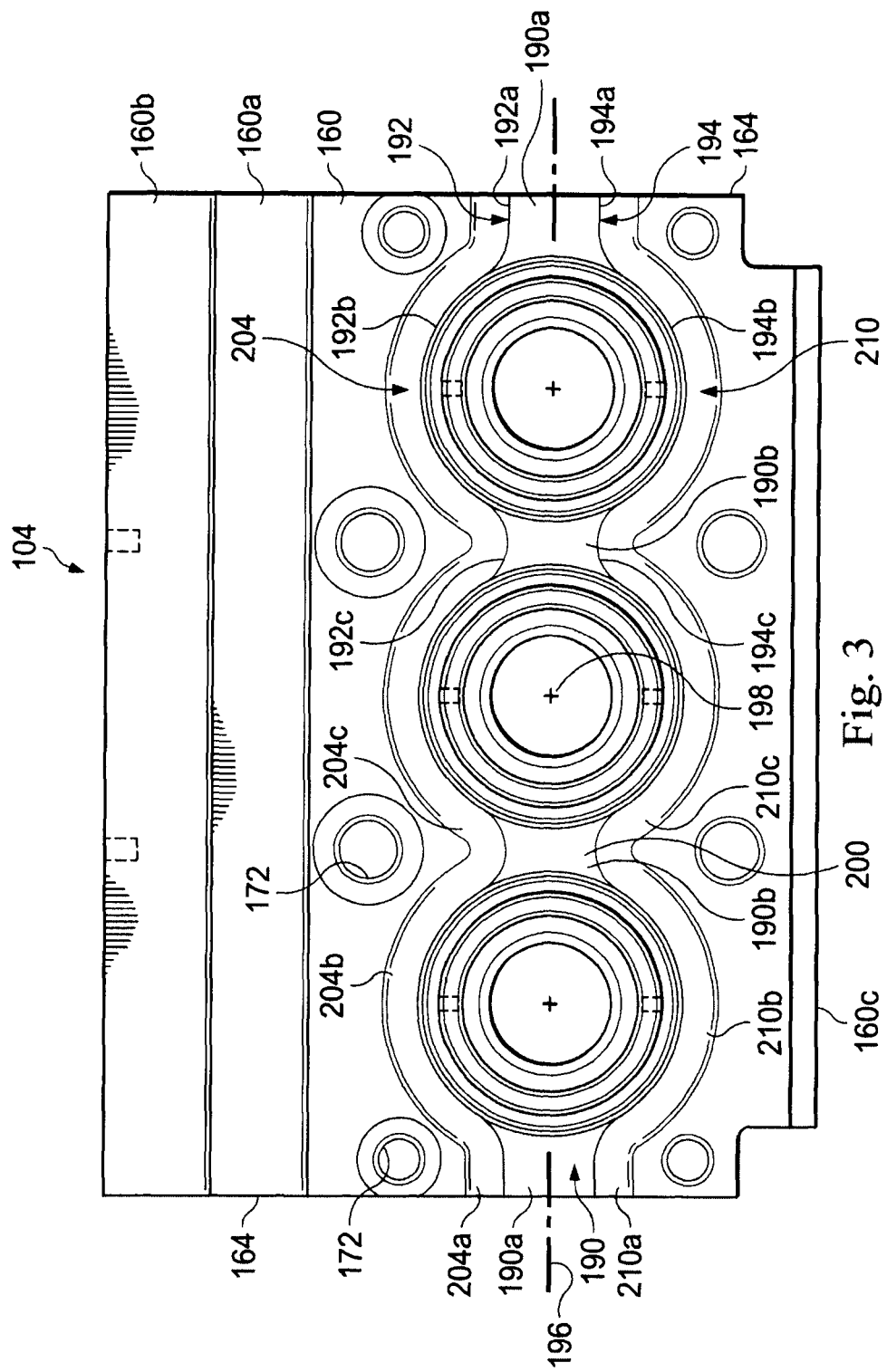
FIG. 3 is a front view of the fluid end block of the well service pump of FIG. 1 according to an exemplary embodiment.

Referring also to FIG. 3, a web 190 is integrally formed on the fluid end forward side 160 and joins the bosses 176. The web 190 is a band that extends from one outboard side 164 to the other, except for intersections with bosses 176, and which protrudes from the fluid end block forward side 160. The web 190 includes two outboard portions 190*a*, each of which extends from one of the outboard bosses 176*a* to one of the outboard sides 164. The web 190 also has two intermediate portions 190*b*, each of which extends from intermediate boss 176*b* to one of the outboard bosses 176*a*. The web 190 has an upper side 192 and a lower side 194 that have straight as well as curvilinear portions. A plane 196 is shown in FIG. 3. The plane 196 passes through the web 190 from one outboard side 164 to the other outboard side and equidistant between the upper and lower sides 192, 194 and also passes through each axis 198 of each plunger bore 150. The web 190 has a forward face 200 that in this embodiment is flat and parallel with the boss forward ends 178 and the fluid end block forward side 160.

The upper side 192 and the lower side 194 each form curvilinear surfaces undulating between tie rod holes 172 and the bosses 176. As such, the web 190 is devoid of tie rod holes. These upper and lower sides 192, 194 of the web 190 are formed to be substantially perpendicular to the face of the forward side 160. The upper side 192 includes two outboard portions 192*a*, each having an end joining one of the outboard sides 164, includes circumferential portions 192*b* extending convexly partially around an upper portion of each boss 176, and includes intermediate portions 192*c* each extending concavely between the upper circumferential portions 192*b*. In the embodiment shown, the convex portions form peaks and the concave portions form valleys. In the embodiment shown, the lower side 194 is a mirror image of the upper side and includes two outboard portions 194*a*, each having an end joining one of the outboard sides 164, includes circumferential portions 194*b* extending convexly partially around an upper portion of each boss 176, and includes intermediate portions 194*c* each extending concavely between the upper circumferential portions 194*b*.

In some embodiments, the upper and lower circumferential portions 192*b*, 194*b* are convexly curved surfaces concentric with the diameter of the bosses 176. In the embodiment disclosed herein, the intermediate portions 192*c*, 194*c* are concavely curved surfaces are non-concentric with the diameter of the tie rod holes 172, but smoothly connect the concavely curved surfaces of the circumferential portions 192*b*, 194*b*. In other embodiments, the profile of the upper and lower sides 192, 194 varies to be either greater or less than that described herein, depending upon the size and positions of the bosses 176 and tie rods holes 172. Furthermore, in some embodiments, the upper and lower sides 192, 194 are not mirror images of each other.

An upper fillet 204 joins the web upper side 192 to the fluid end forward side 160. The upper fillet 204 is a curved surface extending continuously from one outboard side 164 to the other. The upper fillet 204 has two outboard portions 204*a*, each having an end joining one of the outboard sides 164. Each fillet outboard portion 204*a* joins the upper side 192 of the outboard web portion 190*a* to the fluid end block forward side 160, which is in a plane 90 degrees relative to a plane containing the upper sides 192 of the web outboard portions 190*a*. An upper fillet circumferential portion 204*b* extends partially around an upper portion of each boss 176. The upper fillet circumferential portion 204*b* is a curved surface joining an upper portion of the outer diameter of each boss 176 to the fluid end block forward side 160. In this example, the upper fillet circumferential portion 204*b* extends about 115 degrees about the plunger axis 198, but the extent may vary. In this exemplary embodiment, there are two upper intermediate fillet portions 204*c*, each extending from an end of the upper circumferential fillet portions 204*b* to an end of the adjacent upper circumferential fillet portion. The upper intermediate fillet portions 204*c* are generally U-shaped, with the legs of the "U" extending upward. The upper intermediate fillet portions 204*c* are curved surfaces joining the intermediate web portions 190*b* to the forward side 160 of the fluid end block. Accordingly, in the embodiment shown, the upper circumferential portions form peaks and the intermediate fillet portions form valleys. The outboard portions 204*a*, circumferential portions 204*b*, and intermediate portions 204*c* form the continuous upper fillet 204 extending from one fluid end outboard side 164 to the other.

A lower fillet 210 is an inverted image of the upper fillet 204 and joins the lower side 194 of the web 190 to the forward side 160 of the fluid end block 104. The lower fillet 210 is a curved surface extending continuously from one outboard side 164 to the other. The lower fillet 210 has two outboard portions 210*a*, each having an end joining one of the outboard sides 164. Each fillet outboard portion 210*a* joins the lower side 194 of the outboard web portion 190*a* to the fluid end block forward side 160, which is in a plane 90 degrees relative to a plane containing the lower sides 194 of the outboard portions 190*a*. A lower fillet circumferential portion 210*b* extends partially around a lower portion of each boss 176. The lower fillet circumferential portion 210*b* is a curved surface joining a lower portion of the outer diameter of each boss 176 to the forward side 160 of the fluid end block. In this example, the lower fillet circumferential portion 210*b* extends about 115 degrees about plunger axis 198, but the extent may vary. There are two lower intermediate fillet portions 210*c*, each extending from an end of the lower circumferential fillet portions 210*b* to an end of the adjacent lower circumferential fillet portion.

The lower intermediate fillet portions 210*c* are generally U-shaped, with the legs of the "U" extending downward. The lower intermediate fillet portions 210*c* are curved surfaces joining intermediate web portions 190*b* to the fluid end block forward side 160. The outboard portions 210*a*, circumferential portions 210*b*, and intermediate portions 210*c* form the continuous lower fillet 210 extending from one fluid end block outboard side 164 to the other. The upper and lower fillets 204, 210 do not contact each other.

Figure 4:
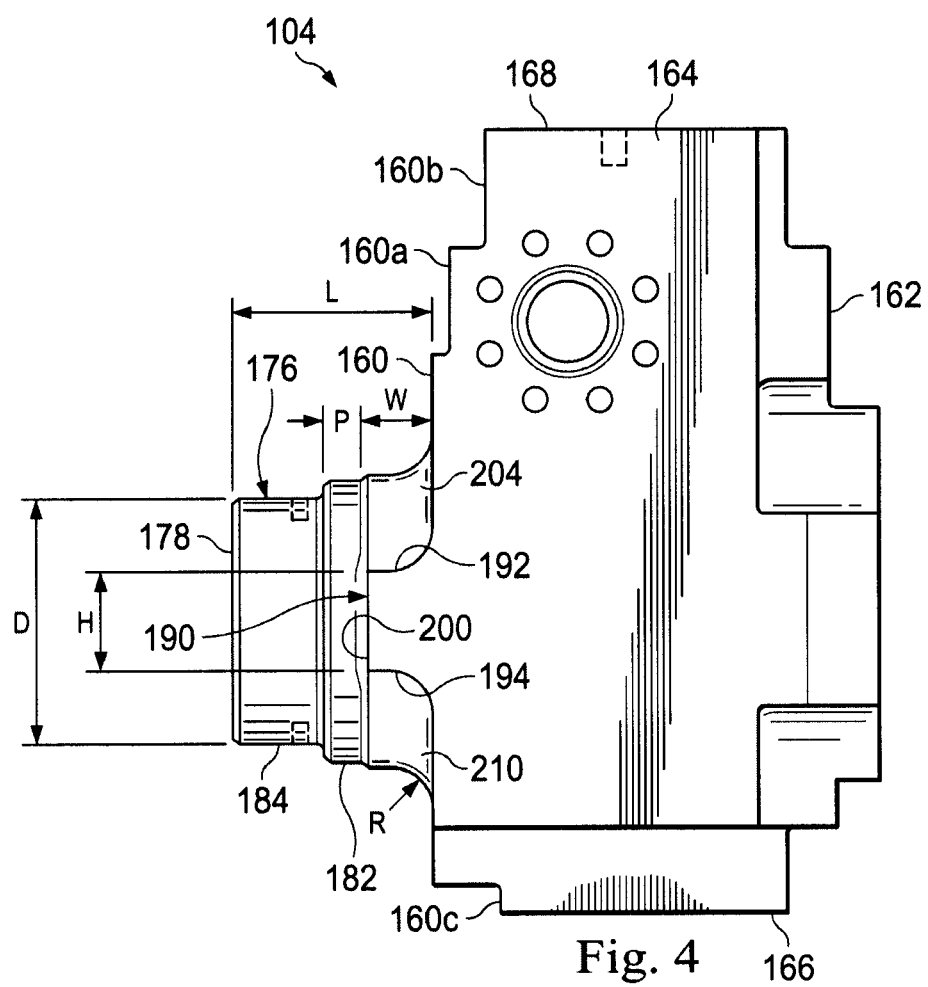
FIG. 4 is a side view of the fluid end block of the well service pump of FIG. 1 according to an exemplary embodiment.
Figure 5:
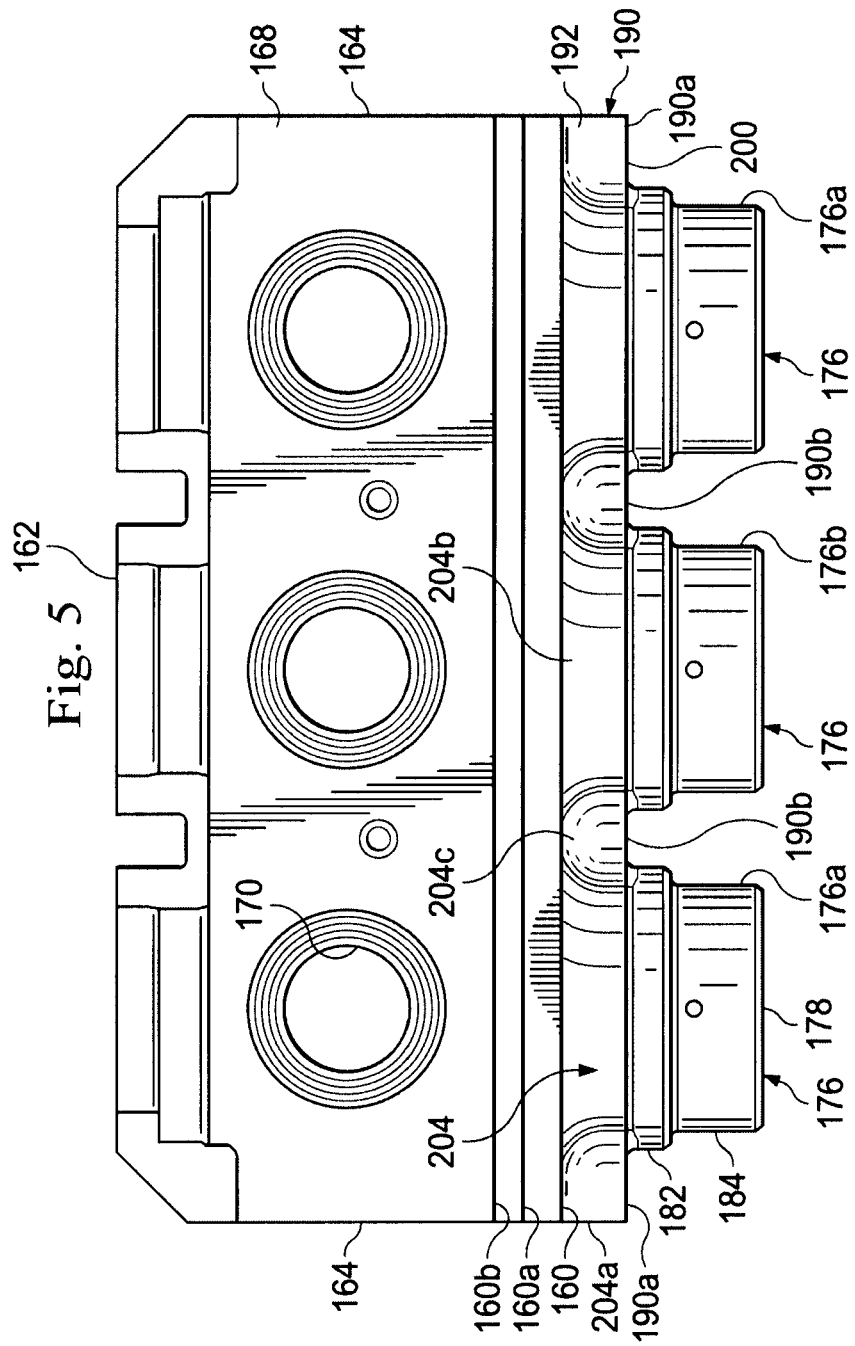
FIG. 5 is a top view of the fluid end block of the well service pump of FIG. 1 according to an exemplary embodiment.

Referring to FIG. 4, the forward end 178 of each boss 176 is located a distance L from the forward side 160 of the fluid end block 104. The distance L may vary, but will typically be greater than one half of the outer diameter D of the forward portion 184 of each boss 176. In this example, distance L is about 80% of the outer diameter D. In some embodiments, the distance L may be a distance within a range of about 5 in. to 15 in., while in other embodiments, the distance L may be a distance within a range of about 6 in. to 8 in. In one embodiment, the dimension L is about 7 in. Other distances are contemplated. The distance L is also proportional to a length of the stroke of plunger 138 (FIG. 1). A long stroke for plunger 138 will result in a greater distance L. The forward face 200 of the web 190 is located a distance W from the forward side 160 of the fluid end block 104. The distance W is less than the distance L and in another embodiment the distance W is less than one-half of the distance L. In this example, the distance W is about 35% of the distance L, but it may vary. The distance W, which can be the width of the web 190, is preferably the same in the web outboard portions 190a and the intermediate portions 190b. In some embodiments, the distance W may be a distance within a range of about 1 in. to 6 in., while in other embodiments, the distance W may be a distance within a range of about 1.5 in. to 3 in. In one embodiment, the distance W is about 2.25 in. Other distances are contemplated. The distance H is the distance from the web upper side 192 to the web lower side 194 and is less than the boss outer diameter D when measured between the intermediate portions 190b and the outboard portions 190a on the web 190. Preferably, the distance H is less than one-half of the boss outer diameter D. In this embodiment, distance H is about 40% of distance D, but it may vary. Distance H, which may be considered to be a vertical dimension of the forward face 200 of the web 190, may be the same in the web outboard portions 190a and the intermediate portions 190b. FIG. 5 illustrates the constant width of the web portions 190a and 190b.

Referring still to FIG. 4, the width P of the cylindrical base portion 182 may be compared to the length of the protrusion L of each boss 178 from the fluid end block forward face 160 to the boss forward end 178. In the exemplary embodiment shown, the ratio of L/P is about 1.867. In other embodiments, the ratio of L/P is in the range of from about 1.750 to about 1.944. In some embodiments, the width P may be a width within a range of about 0.5 in to 4 in., while in other embodiments, the width P may be a width within a range of about 1 in. to 2 in. In one embodiment, the width P is about 1.5 in. Other widths are contemplated.

In this embodiment, the upper fillet 204 and the lower fillet 210 have a constant radius R from one outboard side 164 to the other. Preferably, the radius R is a dimension that is greater than one-half of the distance W from the fluid end block forward side 160 to the web forward face 200. In the exemplary embodiment, the radius R is about 60% of distance W, but the radius may vary. In some embodiments, the radius R may be a radius within a range of about 0 to 3 in., while in other embodiments, the radius R may be a radius within a range of about 0 to 1.38 in. In one embodiment, the radius R is about 0.38 in. Other radiuses are contemplated.

Figure 6:
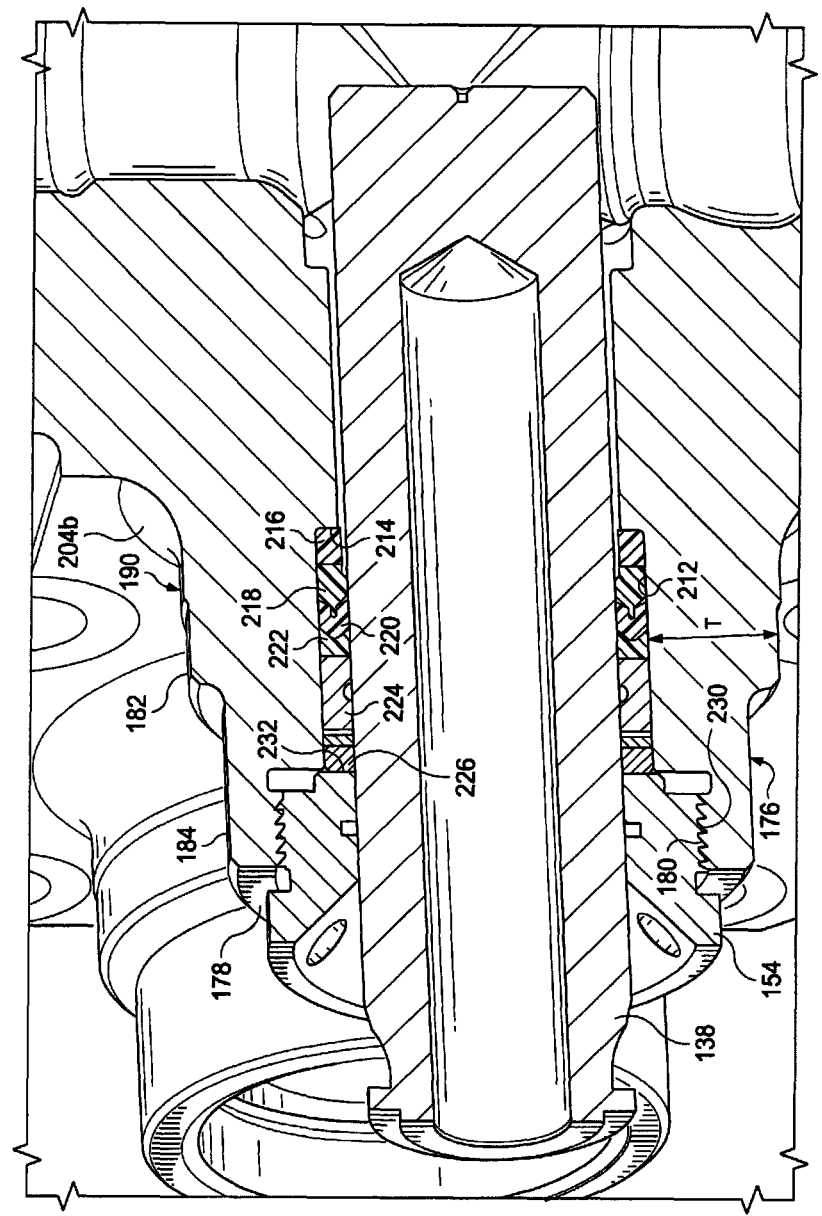
FIG. 6 is an enlarged sectional view of a portion of the fluid end of the well service pump of FIG. 1 according to an exemplary embodiment.

Referring to FIG. 6, each boss 176 has a wall thickness T measured from a counterbore 212, which receives the packing 152, to base portion 182. In the embodiment shown, the thickness T over radius R is about 1.5. In another embodiment, the ratio T/R is in the range of from about 1.0 to about 2.25.

Referring to FIG. 6, each plunger bore 150 has a counterbore 212 formed therein for receiving the packing 152. The counterbore 212 results in a forward facing shoulder 214 that is abutted by a rearward end of the packing 152. In this embodiment, the forward facing shoulder 214 is located within the boss 176 and in a plane forward from the forward side 160 of the fluid end block 104. The packing 152 may be a variety of types and contain a variety of different rings. As an example only, the packing 152 may have a trash ring 216 at its rearward end that abuts the shoulder 214. The trash ring 216 does not seal pressure; rather it serves to exclude large particle debris from the remainder of the packing 152. An energizing ring 218 may abut the forward side of the trash ring 214. The energizing ring 218 also does not seal to the plunger 138; rather it energizes or deforms a main seal ring 220 into sealing engagement with the side wall of the counterbore 212 and the outer diameter of plunger 138. The main seal 220 is typically formed of a rubber type of material softer than the energizing ring 218, and it may have a concave rearward side and convex forward side. A hard plastic ring 222 is located on the forward side of the main seal ring 220. A lantern ring 224, typically formed of brass, has a lubricant port (not shown) extending from its outer diameter to its inner diameter for dispensing lubricant to the plunger 138. Lubricant is supplied from a lubricant passage (not shown) extending through the boss 176. One or more forward rings 226 may be located on the forward side of the lantern ring 224 to accommodate the rotation of the retainer nut 154 as it is being installed and to retard lubricant leaking out the forward end of the counterbore 212.

The retainer nut 154 has external threads 230 that engage the plunger bore threads 180. The retainer nut 154 has a rearward end 232 that abuts the forward ring 226. Tightening the retainer nut 154 applies an axial compressive force on the packing 152, which causes the main seal 220 to sealingly engage the outer diameter of the plunger 138. The outer diameter of the plunger 138 does not slide against the bore of the retainer nut 154 or the plunger bore 150 because of the clearances being provided.

Figure 7:
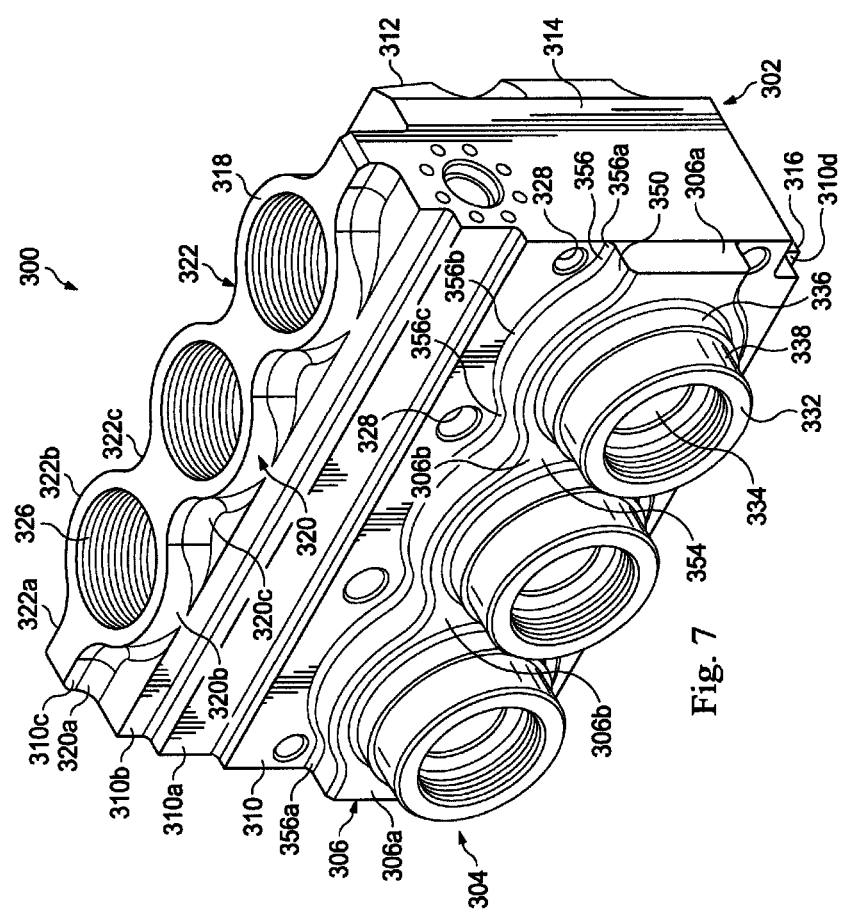
FIG. 7 is a perspective view of another embodiment of a fluid end block usable on the well service pump of FIG. 1 according to an exemplary embodiment.
Figure 8:
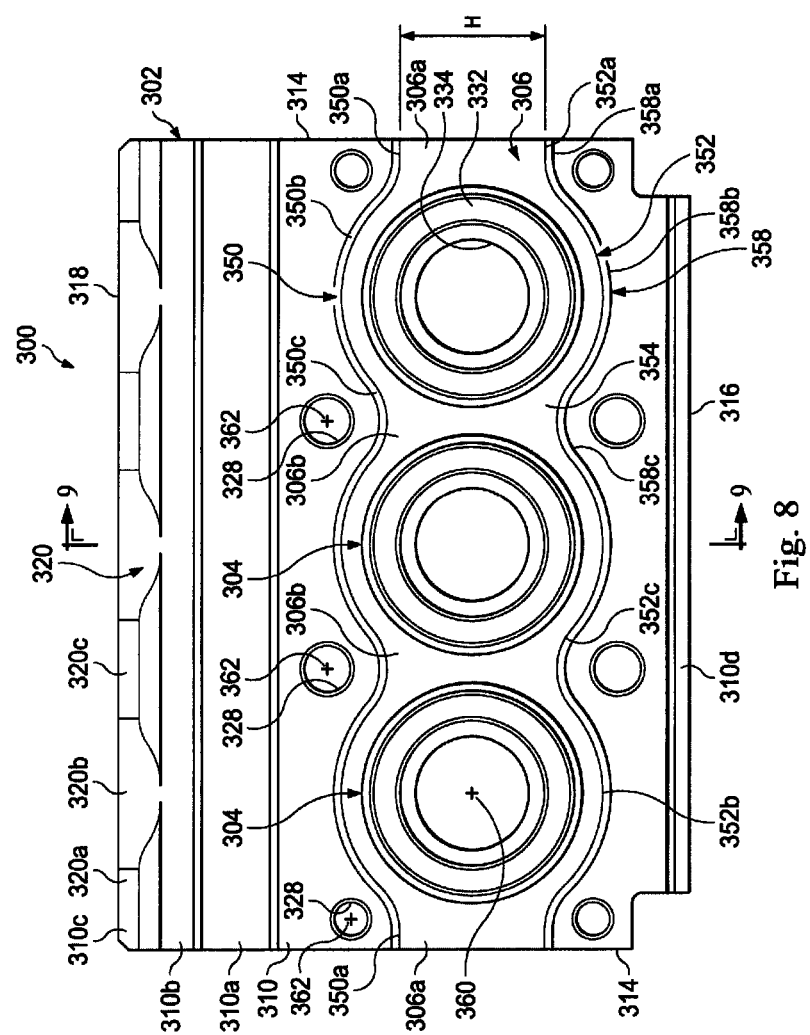
FIG. 8 is a front view of the fluid end block of the well service pump of FIG. 7 according to an exemplary embodiment.
Figure 9:
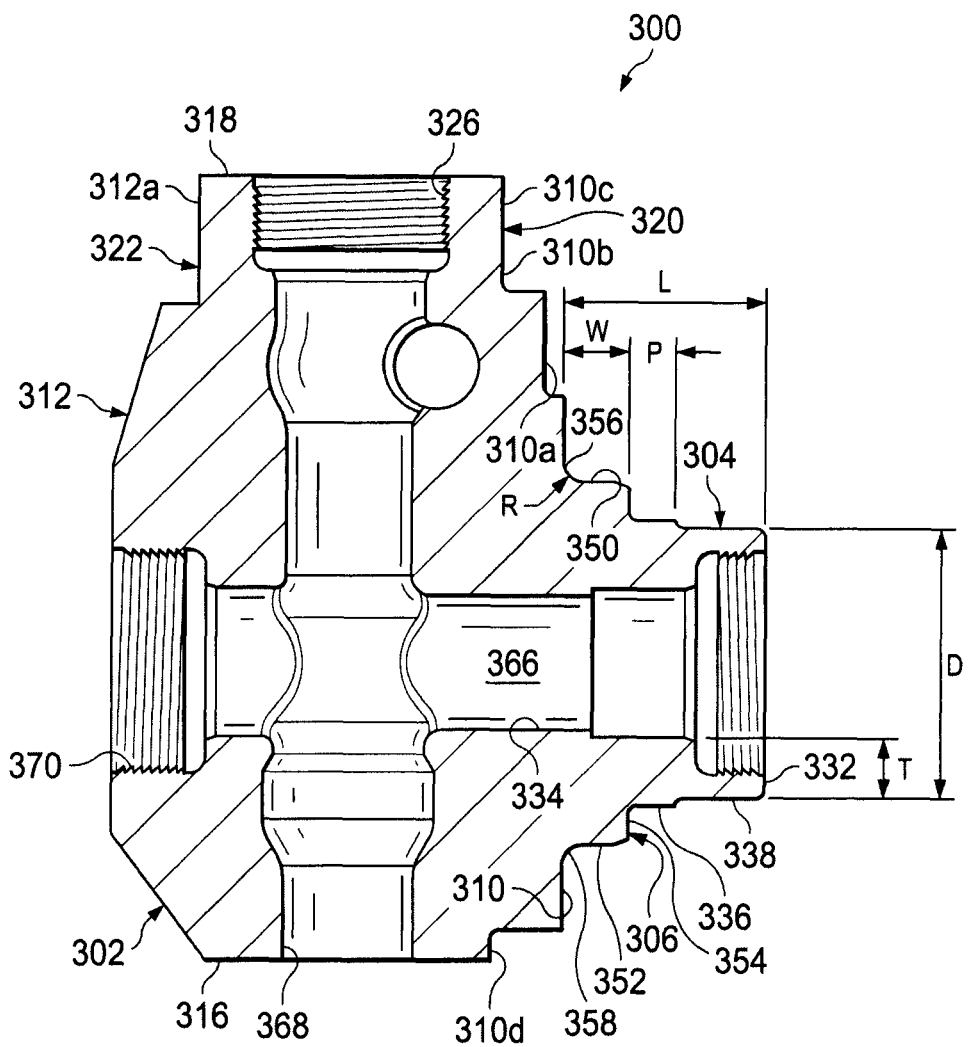
FIG. 9 is a sectional view of a portion of the fluid end of the well service pump of FIG. 7 according to an exemplary embodiment.

FIGS. 7-9 show another exemplary fluid end block referenced herein by the numeral 300 consistent with the principles of the present disclosure. FIG. 7 is a perspective view, FIG. 8 is a front elevation view, and FIG. 9 is a cross-sectional view taken through the lines 9-9 in FIG. 8. Referring to all three of these Figures, the fluid end block 300, like the fluid end block 104 discussed above, may form a part of the fluid end 103 of the reciprocating pump 100 in FIG. 1. The fluid end block 300 has many features similar to the fluid end block 104 described above, and much of the description above applies to the fluid end block 300. To avoid repetition, not all the features will be re-described. In this exemplary embodiment, the fluid end block 300 includes a main body portion 302, a plurality of bosses 304, and a web portion 306.

The main body portion 302 includes a forward face or forward side 310, a rearward side 312, outboard sides 314, a bottom 316, and a top 318. The forward side 310 forms a relatively flat planar surface and as described above, includes two planar stepped recess portions 310a, 310b along the upper section, includes a curvilinear stepped recess portion 310c, and includes a planar stepped recess portion 310d along a bottom section. In this embodiment, the stepped recess portions 310a, 310b, 310d are generally flat and may form planes parallel to the plane formed by the forward side 310. The curvilinear stepped recess portion 310c has an undulating profile 320 with an outboard portion 320a, a circumferential portion 320b, and an intermediate portion 320c.

Still referring to FIG. 7, as can be seen the rearward side 312 also includes a curvilinear portion 312a that mirrors the curvilinear stepped recess portion 310c. As such, it includes an undulating profile 322 with an outboard portion 322a, a circumferential portion 322b, and an intermediate portion 322c. The top surface 318 between the front curvilinear portion 310a and the rearward curvilinear portion 312a therefore has a width that increases and decreases along the length of the top surface 318.

In the exemplary embodiment shown, the top 318 has a plurality of access ports 326 formed therein that provide access to an internal cylinder chamber (described below). The access ports 326 enable communication with a high pressure tube extending from the pump to a manifold truck for feeding to a well bore.

In this embodiment, the curvilinear portions 310c, 312a are in part concentric with the access ports 326. More particularly, in the embodiments disclosed, the circumferential portions 320b, 322b are concentric with the inner diameter of the access ports 324, and the intermediate portions 320c, 322c connect the respective circumferential portions. The undulating profiles 320, 322 are smoothly curved to limit stress risers while still providing suitable strength for operation. They may also reduce the overall weight of the fluid end block and may reduce material costs by removing unnecessary or over-engineered material.

As described above, the forward side 310 includes a plurality of tie rod holes 328 formed therein to receive tie rods (shown in FIG. 1) connecting the fluid end block to the power end 102 of the reciprocating pump. In this embodiment the tie rod holes 328 are threaded and are configured to connect the main body portion 302 to the power end 102. As such, as the tie rods are tightened in place, the main body portion 302 is pulled toward the power end of the reciprocating pump. Because the applied loading is on the main body portion instead of the bosses or web, the bosses and the web may be subject to less stress than when the plurality of bosses has flanges at their distal ends that connect to tie rods.

The bosses 304 and the web portion 306 protrude from the forward side 310 in the manner described above. Like the bosses 176 described above, the bosses 304 in FIGS. 7-9 are integrally formed with the main body portion 302 and include two outboard bosses and at least one intermediate boss located between the two outboard bosses. Each boss 304 is generally cylindrical in shape and includes a forward end 332 that is forward of the main body forward side 310. Each boss 304 has a plunger bore 334 extending into the main body portion 302 from the forward end 332. In this embodiment, each boss 304 includes an optional cylindrical base portion 336 that has a larger outer diameter than a cylindrical forward portion 338.

Referring to FIGS. 7-9, the web portion 306 is integrally formed on the fluid end forward side 310 and joins the bosses 304. Like the web 190 described herein, the web 306 is a band that extends from one outboard side 314 to the other, and which protrudes from the fluid end block forward side 310. The web 306 includes two outboard portions 306a, each of which extends from one of the outboard bosses to one of the outboard sides 314. The web 306 also has two intermediate portions 306b, each of which extends between the intermediate boss and the outboard bosses. The web 306 has an upper side 350 and a lower side 352 that have straight as well as curvilinear portions. The web 306 has a forward face 354 that in this embodiment is flat and parallel with the boss forward ends 332 and the fluid end block forward side 310.

The upper side 350 and the lower side 352 each form curvilinear surfaces undulating between the tie rod holes 328 and the bosses 304. These upper and lower sides 350, 352 of the web 306 are formed to be substantially perpendicular to the face of the forward side 310. The upper side 350 includes two outboard portions 350a, each having an end joining one of the outboard sides 314, includes circumferential portions 350b extending convexly partially around an upper portion of each boss 304, and includes intermediate portions 350c each extending concavely between the upper circumferential portions 350b. In the embodiment shown, the lower side 352 is a mirror image of the upper side and includes two outboard portions 352a, each having an end joining one of the outboard sides 314, includes circumferential portions 352b extending convexly partially around an upper portion of each boss 304, and includes intermediate portions 352c each extending concavely between the upper circumferential portions 350b.

In some embodiments, the upper and lower circumferential portions 350b, 352b are convexly curved surfaces concentric with the diameter of the bosses 304. In some embodiments, the intermediate portions 350c, 352c are concavely curved surfaces concentric with the diameter of the tie rod holes 328. In this example, the intermediate portions 350b, 352b extend about 90 degrees about a plunger axis 360, and the circumferential portions 350c, 352c extend about 90 degrees about a tie rod axis 362. In other embodiments, the profile of the upper and lower sides 350, 352 varies to be either greater or less than that described herein, depending upon the size and positions of the bosses 304 and the tie rods holes 328. Furthermore, in some embodiments, the upper and lower sides 350, 352 are not mirror images of each other. In the embodiment shown in FIGS. 7-9, there are two upper intermediate portions 350c, each extending from an end of the upper circumferential portions 350b to an end of the adjacent upper circumferential portion 350b.

In a manner similar to that described above with reference to the fluid end block 104, the fluid end block 300 includes an upper fillet 356 that joins the web upper side 350 to the fluid end forward side 310. The upper fillet 356 is a curved surface extending continuously from one outboard side 314 to the other. The upper fillet 356 has two outboard portions 356a, two circumferential portions 356b, and two intermediate portions 356c, formed in the manner described above. Likewise, the fluid end block 300 includes a lower fillet 358 joining the web lower side 352 to the fluid end forward side 310. The lower fillet 358 includes outboard portions 358a, circumferential portions 358b, and intermediate portions 358c as described above.

In the example shown, the undulating design of the web portion 306 provides stress relief and support to the bosses 304, while enabling the tie rods rod holes 328 to be disposed close in proximity to the bosses 304 while still being formed in the forward face of the main body, rather than in a face of a surface offset from the forward face 310 of the main body portion 304. Attaching the tie rods to the main forward surface 310 of the main body portion 304 may reduce stress that might otherwise be on the bosses because the bosses 304 are no longer the attachment elements of the fluid end to the power end of the pump.

The fluid end block 300 may be sized differently than the fluid end block 104, but includes a distance L between the forward side 332 of each boss 304 and the forward surface 310, includes an outer diameter D of the forward portion 338 of each boss 304, a web distance W between the forward face 354 of the web 306 and the forward face 310 of the main body portion 302, a distance H from the web upper side 350 to the web lower side 352 and in the embodiments shown is less than the boss outer diameter D at the intermediate portions 306b of the web 306 and at the outboard portions 306a of the web 306. In addition, the fluid end block 300 includes a length P representing the length of the cylindrical base portion 336. The radius of the fillets 356, 358 may have a constant radius R and the bosses 304 have a wall thickness T. Dimensions for the variables are discussed above with reference to the fluid end block 104.

The cross-section view in FIG. 9, taken along lines 9-9 in FIG. 8, shows chambers and entrance and exit ports of the fluid end block 300 in greater detail. For example, FIG. 9 shows a cylinder chamber 366, the plunger bore 334, a suction valve port 368, the access port 326 as a discharge port, and a second access port 370. In use, the suction valve port 368 communicates with a manifold and the access port 326 communicates with a high pressure fluid line. The second access port 370 receives a suction cover plate as shown in FIG. 1.

Figure 10:
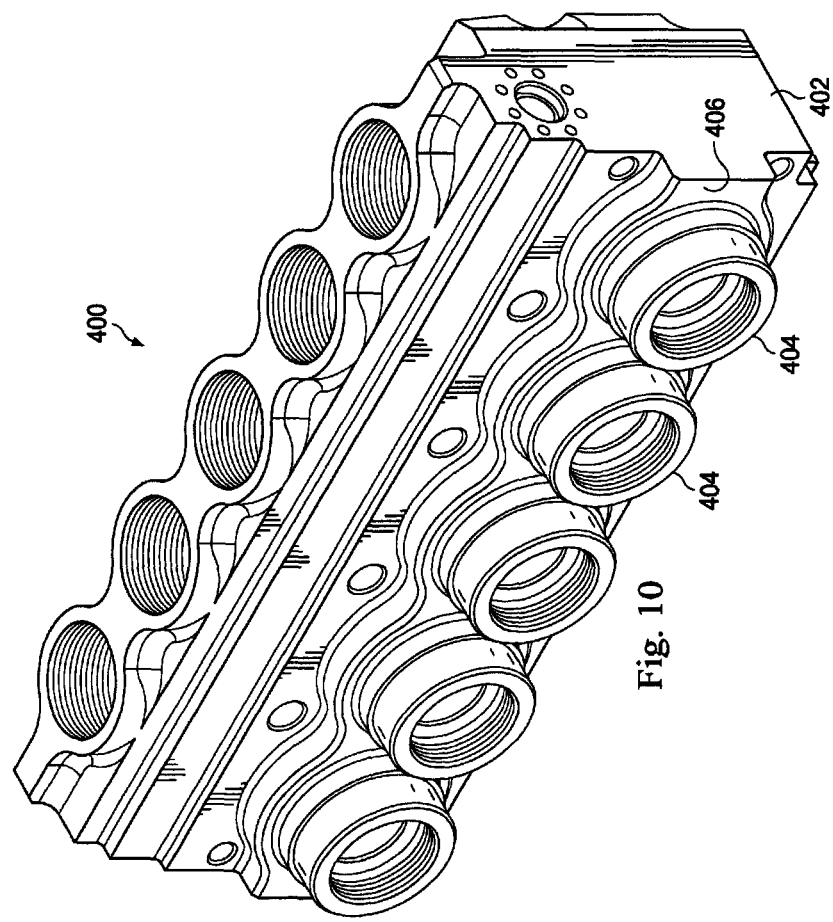
FIG. 10 is a perspective view of another embodiment of a fluid end block usable on the well service pump of FIG. 1 according to an exemplary embodiment.
Figure 11:
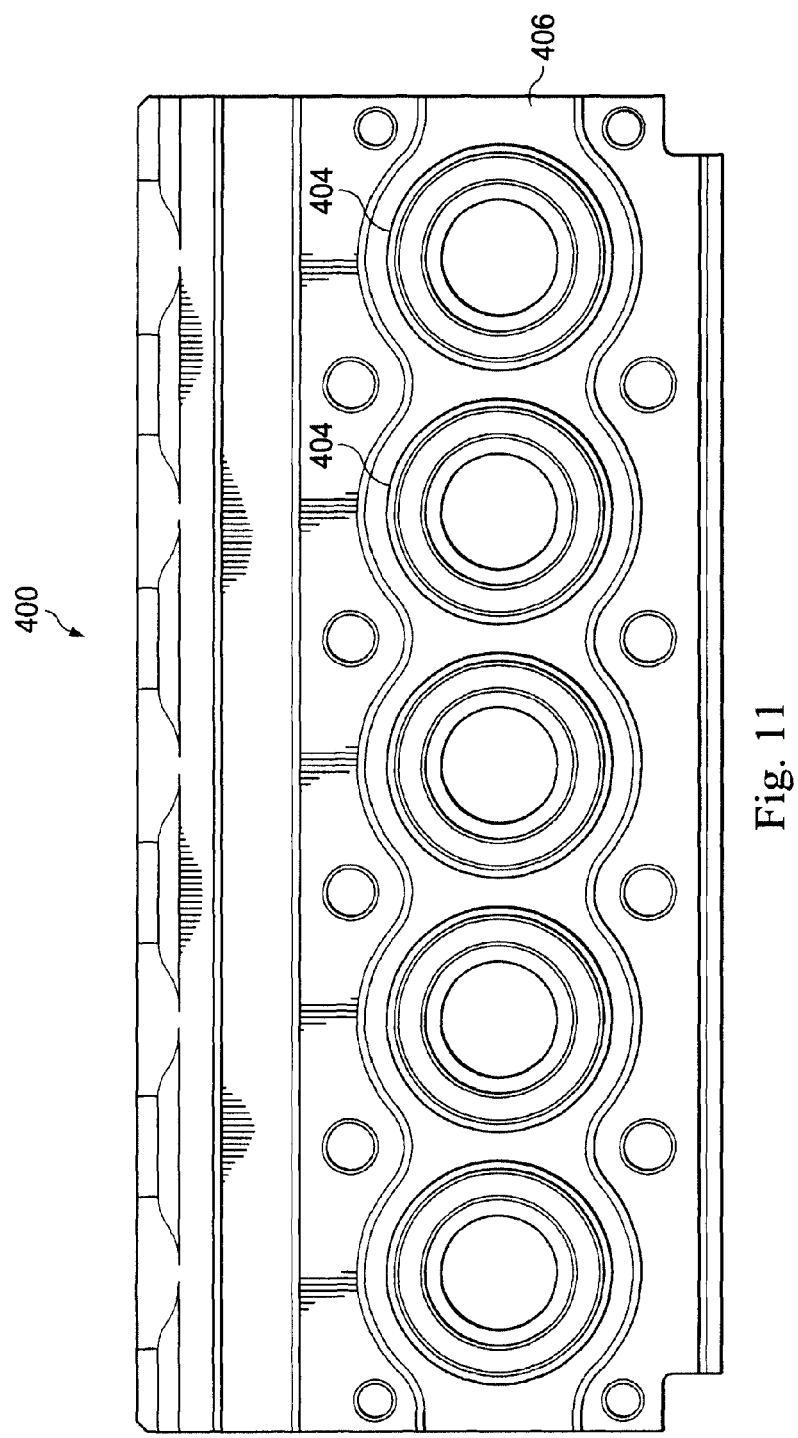
FIG. 11 is a front view of the fluid end block of the well service pump of FIG. 10 according to an exemplary embodiment.

FIGS. 10 and 11 show another exemplary fluid end block referenced herein by the numeral 400 consistent with the principles of the present disclosure. The fluid end block 400, like the fluid end blocks 104 and 300 discussed above, may form a part of the fluid end 103 of the reciprocating pump 100 in FIG. 1. The fluid end block 400 has many features similar to the fluid end blocks 104 and 300 described above, and much of the description above applies to the fluid end block 400. Again, to avoid repetition, not all the features will be re-described. A primary difference between the fluid end block 400 and the fluid end block 300 is that the fluid end block 300 has a triplex fluid end, as it has three bosses with three bores, while the fluid end block 400 has a quint or a quintuplex fluid end, as it has five bosses with five bores.

As can be seen, the fluid end block 400 includes a main body portion 402, a plurality of bosses 404, and a web portion 406. In all respects except for the number of bosses and its impact on the sizes of various features of the fluid block, the discussion above applies to the fluid end block 400 in all respects.

In each of the embodiments described herein, the fluid end block main body portion, the bosses, and web are integrally formed with each other. That is, there are no welds or fasteners securing bosses and the portions of web to the fluid end block and each other. Accordingly, they are formed from a monolithic material. The fluid end block, bosses, and the portions of web are formed from a single-piece steel alloy forging, which remains a single piece after machining. Preferably, a single-piece steel alloy forging is made having approximate dimensions for the fluid end block, including the main body, the bosses, and the web. The single piece forging may also have cavities with approximate dimensions for the plunger bores. Alternately, some of these features may be entirely machined from the single-piece forging. The manufacturer then machines the single-piece forging into a single-piece member with the shape shown in the Figures herein. The machining operations will normally provide the final dimensions of the bosses, plunger bores, web, and fillets. The plunger bore threads will also be formed. Then the packing and the plunger are inserted into each plunger bore and the separately machined retainer nut is secured to the threads.

With the fluid end block now properly sized and shaped for installation on reciprocating pump, the fluid end may be transported to a power end of a reciprocation pump. The fluid end blocks described herein may be used to build a new pump or may be used to refurbish or repair a used reciprocating pump. The fluid end block may be connected to a power end by inserting a plunger into the plunger bore of the pump so that the plunger passes through the retainer nut and the packing. With the plunger in place, tie rods may be used to connect to the tie rod holes in the forward side of the fluid end block. To do this, the tie rods may be placed to extend past the bosses and past the web on the fluid face to be received in the tie rod holes formed in the main body. They may be aligned to pass between the peaks or between the fillets on the web and into the tie rod holes in the forward side, extending beyond the web and the bosses, with the web being entirely devoid of tie rod holes. With the tie rods connected to the fluid end block, the tie rods may be tightened to secure the fluid end block in place relative to the power end. Since the tie rods bypass the bosses and bypass the web, the tie rods do not apply direct tension loads on the web or bosses, reducing the overall stress on the bosses and potentially increasing the useful life of the fluid end block. At the same time, since the tie rods extend between parts of the web, either between peaks of the upper and lower surface or between fillets on the web, the tie rods can be disposed in close proximity to the web and bosses to provide stabilizing support as the plunger pumps fluid to providing sufficient holding force to maintain the fluid end block in place. With the fluid end block now secured to the power end of the reciprocating pump, the suction manifold may be connected to the fluid end block and the pump may be connected to the manifold or additional tubing for use in a pumping application.

Operation is described below referring to FIG. 1. However, it should be understood that the discussion applies to any of the fluid end blocks described herein. During operation, the plunger 138 reciprocates, or moves longitudinally toward and away from the cylinder chamber 108, as the crankshaft 122 rotates. As the plunger 138 moves longitudinally away from the cylinder chamber 108, the pressure of the fluid inside the chamber 108 decreases, creating a differential pressure across the inlet valve 116, which actuates the valve 116 and allows the fluid to enter the cylinder chamber 108 from the suction manifold 110. The fluid being pumped enters the chamber 108 as the plunger 138 continues to move longitudinally away from the cylinder chamber 108 until the pressure difference between the fluid inside the cylinder chamber 108 and the fluid in the suction manifold 110 is small enough for the inlet valve 116 to actuate to its closed position. As the plunger 138 begins to move longitudinally towards the cylinder chamber 108, the pressure on the fluid inside the cylinder chamber 108 begins to increase. The fluid pressure inside the chamber 108 continues to increase as the plunger 138 approaches the cylinder chamber 108 until the differential pressure across the outlet valve 118 is large enough to actuate the valve 118 and allow the fluid to exit the cylinder chamber 108 through the discharge port 112. In one embodiment, fluid is only pumped across one side of the plunger 138, therefore the reciprocating pump 100 is a single-acting reciprocating pump. Since the fluid end block main body, bosses and web are integrally formed with each other, there is a reduction of failure points and overall lower stress in the fluid end during operation as compared to the conventional two part design requiring seals and packing glands. Moreover, the abrasion in the plunger bore is reduced using the integrally formed fluid end block main body, bosses, and web as compared to a conventional two part design.

In some exemplary embodiments, variations may be made to the fluid end blocks. In several exemplary embodiments, instead of, or in addition to being used in high pressure reciprocating pumps, the fluid end blocks or the components thereof may be used in other types of pumps and fluid systems.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A fluid end block for attachment to a power end of a high pressure reciprocating pump, comprising:
   a main body portion having a plurality of chambers therein, the main body portion having an outwardly facing body forward face, an outwardly facing body rear face opposite the body forward face, and opposing side surfaces connecting the forward face and the rear face;
   a web portion protruding outwardly from the outwardly facing body forward face, the web portion having an outwardly facing web forward face and a curvilinear side surface, the web portion being integral with the main body portion;
   a plurality of bosses protruding from the web forward face and having a forward facing end, the plurality of bosses being integral with the main body portion and the web portion; and
   a plunger bore extending through one of the plurality of bosses configured to receive a reciprocating plunger, the plunger bore extending from the end of said one of the plurality of bosses to one of the plurality of chambers in the main body portion.

2. The fluid end block of claim 1, wherein the curvilinear side surface comprises a convex portion concentric with each of the plurality of bosses.

3. The fluid end block of claim 2, wherein the convex portion has a radius greater than a radius of each of the plurality of bosses.

4. The fluid end block of claim 1, wherein the main body portion comprises a tie rod hole disposed adjacent the web portion, the tie rod hole being disposed between undulating portions of the web portion.

5. The fluid end block of claim 4, wherein the undulating portions are a portion of the curvilinear side surface.

6. The fluid end block of claim 4, wherein the undulating portions is a part of a fillet connecting the curvilinear side surface of the web portion to the body forward face.

7. The fluid end block of claim 1, wherein each of the plurality of bosses has a first length measured from the web forward face to the end of the boss, and wherein the web portion has a second length measured from the body forward face to the web forward face, the first length being greater than the second length.

8. The fluid end block of claim 1, wherein the web portion extends across the body forward face from one of the opposing side surfaces to the other.

9. The fluid end block of claim 1, wherein the plurality of bosses are aligned in a row so that a single plane passes through a central axis formed by each of the plurality of bosses.

10. The fluid end block of claim 1, wherein the curvilinear side surface of the web portion is perpendicular to the body forward face and perpendicular to the web forward face.

11. The fluid end block of claim 1, wherein each of the plurality of bosses comprises an outer surface portion having a first diameter adjacent the forward facing end and having a second diameter adjacent the web portion, the second diameter being greater than the first diameter.

12. The fluid end block of claim 1, wherein the curvilinear side surface is an upper side surface, the fluid end block comprising a curvilinear lower side surface, wherein the curvilinear upper side surface mirrors the curvilinear lower side surface.

13. A fluid end block for attachment to a power end of a high pressure reciprocating pump, comprising:
    a main body portion having a plurality of chambers therein, the main body portion having an outwardly facing body forward face, an outwardly facing rear face opposite the body forward face, and opposing side surfaces connecting the body forward face and the rear face;
    a plurality of bosses supported by the main body portion and having a forward facing end, the plurality of bosses being integral with the main body portion and having an outer diameter at the forward facing end;
    a web portion protruding outwardly from the outwardly facing body forward face of the main body portion, the web portion having a longitudinal length and a transverse height, the web portion joining each of the plurality of bosses to each other, the transverse height of the web portion being greater than the outer diameter of the plurality of bosses; and
    a plunger bore extending through one of the plurality of bosses configured to receive a reciprocating plunger, the plunger bore extending from the end of said one of the plurality of bosses to one of the plurality of chambers in the main body portion.

14. The fluid end block of claim 13, wherein the web portion comprises a curvilinear side surface comprising a convex portion concentric with each of the plurality of bosses.

15. The fluid end block of claim 14, wherein the convex portion of the web portion has a radius greater than a radius of each of the plurality of bosses.

16. The fluid end block of claim 13, wherein the main body portion comprises a tie rod hole disposed adjacent the web portion, the tie rod hole being disposed between undulating portions of the web portion.

17. The fluid end block of claim 16, wherein the undulating portions are curvilinear side surfaces.

18. The fluid end block of claim 16, wherein the undulating portions are part of a fillet connecting a curvilinear side surface of the web to the body forward face.

19. The fluid end block of claim 13, wherein each of the plurality of bosses has a first length measured from a web forward face to the end of the boss, and wherein the web portion has a second length measured from the body forward face to the web forward face, the first length being greater than the second length.

20. The fluid end block of claim 13, wherein the web portion extends entirely across the body forward face from one of the opposing side surfaces to the other.

21. The fluid end block of claim 13, wherein the plurality of bosses are aligned in a row so that a single plane passes through a central axis formed by each of the plurality of bosses.

22. The fluid end block of claim 13, wherein the web portion comprises upper and lower side surfaces and a web forward face, the upper and lower side surfaces being perpendicular to the body forward face and perpendicular to the web forward face.

23. The fluid end block of claim 13, wherein each of the plurality of bosses comprises an outer surface portion having a first diameter adjacent the forward facing end and a second diameter adjacent the web portion, the second diameter being greater than the first diameter.

24. The fluid end block of claim 13, wherein the web portion comprises curvilinear upper and lower side surfaces and a web forward face, wherein the curvilinear upper side surface mirrors the curvilinear lower side surface.

25. A fluid end block for attachment to a power end of a high pressure reciprocating pump, comprising:
a main body portion having an outwardly facing body forward face, an outwardly facing rear face opposite the body forward face, and opposing side surfaces connecting the body forward face and the rear face, the main body portion comprising a plurality of tie rod holes configured to receive tie rods connecting the fluid end block to the power end of a high pressure reciprocating pump;
a web portion protruding outwardly from the body forward face of the main body portion, the web portion having an curvilinear portion adjacent the tie rod holes, the curvilinear portion being shaped and disposed so that at least one of the tie rod holes is disposed between peaks of the curvilinear portion, the web portion being integrally formed with the main body portion;
a plurality of bosses on the web portion, the plurality of bosses being integrally formed with the web portion and the main body portion; and
a plunger bore extending through one of the plurality of bosses configured to receive a reciprocating plunger.

26. The fluid end block of claim 25, wherein the curvilinear portion comprises a convex portion concentric with each of the plurality of bosses.

27. The fluid end block of claim 26, wherein the convex portion has a radius greater than a radius of each of the plurality of bosses.

28. The fluid end block of claim 25, wherein the curvilinear portion comprises a curvilinear side surface.

29. The fluid end block of claim 25, wherein the curvilinear portion comprises a fillet connecting a side surface of the web portion to the body forward face.

30. The fluid end block of claim 25, wherein each of the plurality of bosses has an end and the web portion has a web forward face, each of the plurality of bosses having a first length measured from the web forward face to the end of the boss, and the web portion having a second length measured from the body forward face to the web forward face, the first length being greater than the second length.

31. The fluid end block of claim 25, wherein the web portion extends entirely across the body forward face from one of the opposing side surfaces to the other.

32. The fluid end block of claim 25, wherein the plurality of bosses are aligned in a row so that a single plane passes through a central axis formed by each of the plurality of bosses.

33. The fluid end block of claim 25, wherein the curvilinear portion comprises a side surface of the web portion perpendicular to the body forward face.

34. The fluid end block of claim 25, wherein each of the plurality of bosses comprises an outer surface portion having a first diameter adjacent the forward facing end and a second diameter adjacent the web portion, the second diameter being greater than the first diameter.

35. The fluid end block of claim 25, wherein the curvilinear portion comprises a curvilinear upper side surface and a curvilinear lower side surface, wherein the curvilinear upper side surface mirrors the curvilinear lower side surface.

36. The fluid end block of claim 25, wherein the web portion is devoid of tie rod receiving holes.

37. A fluid end block for attachment to a power end of a high pressure reciprocating pump, comprising:
a main body portion having a plurality of chambers therein, the main body portion having an outwardly facing body forward face, an outwardly facing rear face opposite the body forward face, and opposing side surfaces connecting the body forward face and the rear face, the main body portion comprising a plurality of tie rod holes configured to receive tie rods connecting the fluid end block to a power end of a high pressure reciprocating pump;
a web portion protruding outwardly from the outwardly facing body forward face, the web portion having an outwardly facing web forward face, an upper curvilinear side surface, and a lower curvilinear side surface mirroring the upper curvilinear side surface, the upper and lower curvilinear side surfaces having convex and concave portions, the web portion extending continuously from one of the opposing side surfaces of the main body portion to the other, and being integrally formed with the main body portion;
a plurality of bosses protruding from the web forward face and having a forward facing end, each of the plurality of bosses having an end, a first region of a first diameter adjacent the end, and a second region of a second diameter adjacent the web portion, the second diameter being greater than the first diameter, the plurality of bosses being integral with the main body portion and the web portion, and wherein the convex portions of the upper and lower curvilinear side surfaces are concentric with the second region of each of the plurality of bosses, and wherein the concave portions of the upper and lower curvilinear side surfaces accommodate the tie rod holes so that the tie rod holes are disposed between portions of the web portion; and
a plunger bore extending through one of the plurality of bosses configured to receive a reciprocating plunger, the plunger bore extending from the end of one of the plurality of bosses to one of the plurality of chambers in the main body portion.

38. The fluid end block of claim 37, wherein the tie rod holes are disposed between portions of a fillet connecting the curvilinear side surface of the web portion to the body forward face.

39. The fluid end block of claim 38, wherein the tie rod holes are disposed between portions of the curvilinear upper side surface of the web portion.

40. The fluid end block of claim 37, wherein each of the plurality of bosses has a first length measured from the web forward face to the end of the boss, and wherein the web portion has a second length measured from the body forward face to the web forward face, the first length being greater than the second length.

41. The fluid end block of claim 37, wherein the curvilinear side surface of the web portion is perpendicular to the body forward face and perpendicular to the web forward face.

42. A pump subassembly, comprising:
- a fluid end block having forward and rearward sides, two outboard sides, a bottom, and a top;
- a plurality of bosses protruding in a forward direction from the forward side, the bosses comprising an outboard boss adjacent each of the outboard sides, and at least one intermediate boss located between the outboard bosses;
- a plunger bore extending into the fluid end block from each of the bosses for receiving a reciprocating plunger, each of the plunger bores having a forward end with internal threads;
- a web extending from the forward side of the fluid end block, the web having an outboard portion extending from each of the outboard sides to each of the outboard bosses, the web having an intermediate portion extending between adjacent ones of the bosses;
- the web having an upper side and a lower side, with a dimension between the upper and lower sides that is less than an outer diameter of any one of the bosses; and wherein
- the fluid end block, the bosses and the webs are integrally joined to each other and comprise a single-piece member formed of a steel alloy.

43. The subassembly according to claim 42, wherein:
the web has a forward face that is located forward from the forward side of the fluid end block a distance that is less than a distance from the forward end of each of the bosses to the forward side of the fluid end block.

44. The subassembly according to claim 42, further comprising:
- a continuous upper fillet extending without interruption from one of the outboard sides to the other of the outboard sides, the upper fillet joining the upper sides of the web to the forward side of the fluid end block and joining upper circumferential portions of the bosses to the forward side; and
- a continuous lower fillet extending without interruption from one of the outboard sides to the other of the outboard sides, the lower fillet joining the tower sides of the web to the forward side of the fluid end block and joining lower circumferential portions of the bosses to the forward side.

* * * * *